US009281702B2

(12) United States Patent
Hotta

(10) Patent No.: US 9,281,702 B2
(45) Date of Patent: Mar. 8, 2016

(54) ELECTRIC STORAGE UNIT GROUP, CHARGER, ELECTRONIC DEVICE, ELECTRIC VEHICLE, METHOD FOR CHARGING ELECTRIC STORAGE UNIT GROUP, METHOD FOR DISCHARGING ELECTRIC STORAGE UNIT GROUP, METHOD FOR SUPPLYING AND RECEIVING POWER, AND METHOD FOR DETERMINING CHARGING/DISCHARGING ROUTE IN ELECTRIC STORAGE UNIT GROUP

(75) Inventor: Shin Hotta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 295 days.

(21) Appl. No.: 13/822,200

(22) PCT Filed: Sep. 9, 2011

(86) PCT No.: PCT/JP2011/070615
§ 371 (c)(1),
(2), (4) Date: Mar. 11, 2013

(87) PCT Pub. No.: WO2012/036086
PCT Pub. Date: Mar. 22, 2012

(65) Prior Publication Data
US 2013/0169231 A1    Jul. 4, 2013

(30) Foreign Application Priority Data

Sep. 14, 2010 (JP) .................................. 2010-205885
Sep. 6, 2011 (JP) .................................. 2011-193779

(51) Int. Cl.
*H02J 7/00* (2006.01)
*H01M 10/44* (2006.01)
(Continued)

(52) U.S. Cl.
CPC ........... *H02J 7/0052* (2013.01); *B60L 11/1809* (2013.01); *B60L 11/1853* (2013.01);
(Continued)

(58) Field of Classification Search
CPC ...................................................... H02J 7/0052
USPC ............................................................ 320/118
See application file for complete search history.

(56) References Cited

U.S. PATENT DOCUMENTS

| 5,744,936 | A | 4/1998 | Kawakami | |
| 6,042,961 | A * | 3/2000 | Verhoog et al. | 429/72 |
| 6,465,986 | B1 | 10/2002 | Haba | |
| 7,282,814 | B2 * | 10/2007 | Jacobs | 307/82 |
| 8,129,952 | B2 * | 3/2012 | Lee | 320/140 |
| 2002/0195994 | A1 * | 12/2002 | Perelle | 320/116 |
| 2008/0284375 | A1 * | 11/2008 | Nagaoka et al. | 320/116 |
| 2009/0139781 | A1 * | 6/2009 | Straubel | 180/65.1 |

(Continued)

FOREIGN PATENT DOCUMENTS

| EP | 0609101 | 8/1994 |
| WO | 0035030 | 6/2000 |
| WO | 2010014855 | 2/2010 |

*Primary Examiner* — Richard Isla Rodas
*Assistant Examiner* — Dung V Bui
(74) *Attorney, Agent, or Firm* — Hazuki International, LLC

(57) ABSTRACT

The present invention relates to an electric storage unit group, a charger, an electronic device, an electric vehicle, a method for charging the electric storage unit, a method for discharging the electric storage unit group, a method for supplying and receiving power, and a method for determining a charging/discharging route in the electric storage unit group, which can provide a method for charging the electric storage unit group in which a plurality of electric storage units are connected in a desired form.

The method for charging the electric storage unit group is a method for charging a rechargeable battery cell in an electric storage unit group in which a plurality of electric storage units having rechargeable battery cells are linearly or reticulately connected. At an upstream side of the electric storage unit group, the electric storage unit group is connected to a power supply for charging the electric storage units.

29 Claims, 8 Drawing Sheets

(51) Int. Cl.
*B60L 11/18* (2006.01)
*H01M 6/42* (2006.01)

(52) U.S. Cl.
CPC ......... *B60L11/1877* (2013.01); *H01M 10/441* (2013.01); *H02J 7/0016* (2013.01); *H02J 7/0019* (2013.01); *H02J 7/0063* (2013.01); *H01M 6/42* (2013.01); *H02J 7/0042* (2013.01); *H02J 7/0065* (2013.01); *H02J 2007/0067* (2013.01); *Y02T 10/7005* (2013.01); *Y02T 10/705* (2013.01); *Y02T 10/7055* (2013.01); *Y02T 90/14* (2013.01)

(56) References Cited

U.S. PATENT DOCUMENTS

| | | | |
|---|---|---|---|
| 2010/0028723 A1 | 2/2010 | Haba | |
| 2010/0052614 A1* | 3/2010 | Mariels | 320/116 |
| 2010/0109608 A1* | 5/2010 | Buono et al. | 320/121 |
| 2010/0121511 A1* | 5/2010 | Onnerud et al. | 701/22 |
| 2010/0261048 A1* | 10/2010 | Kim et al. | 429/150 |
| 2012/0001595 A1* | 1/2012 | Maruyama et al. | 320/118 |
| 2012/0188714 A1* | 7/2012 | Von Borck et al. | 361/688 |
| 2013/0169231 A1* | 7/2013 | Hotta | 320/118 |

\* cited by examiner

ELECTRIC STORAGE UNIT GROUP, CHARGER, ELECTRONIC DEVICE, ELECTRIC VEHICLE, METHOD FOR CHARGING ELECTRIC STORAGE UNIT GROUP, METHOD FOR DISCHARGING ELECTRIC STORAGE UNIT GROUP, METHOD FOR SUPPLYING AND RECEIVING POWER, AND METHOD FOR DETERMINING CHARGING/DISCHARGING ROUTE IN ELECTRIC STORAGE UNIT GROUP

CROSS REFERENCES TO RELATED APPLICATIONS

The present application is a national stage of International Application No. PCT/JP2011/070615 filed on Sep. 9, 2011 and claims priority to Japanese Patent Application No. 2010-205885 filed on Sep. 14, 2010 and Japanese Patent Application No. 2011-193779 filed on Sep. 6, 2011 the disclosure of which is incorporated herein by reference.

BACKGROUND

The present disclosure relates to an electric storage unit group, a charger, an electronic device, an electric vehicle, a method for charging the electric storage unit group, a method for discharging the electric storage unit group, a method for supplying and receiving power, and a method for determining a charging/discharging route in the electric storage unit group.

In order to meet requirements for high-power, high-capacity devices, a case of utilizing a type of a battery pack (assembled battery) configured by connecting a plurality of rechargeable batteries (single cells) in parallel and connecting a plurality of parallel-connected rechargeable battery groups in series is increasing. Such a battery pack is known from, for example, Japanese Patent Application Laid-Open No. H6-283210. Typically, in such a battery pack, charging power is supplied from one end of the battery pack. Also, a load is connected to the battery pack, and power is supplied to the load.

CITATION LIST

Patent Document

Patent Document 1: Japanese Patent Application Laid-Open No. H6-283210

SUMMARY

Problems to be Solved by the Invention

By employing the organic connection of a plurality of battery packs, the field of use of battery packs is expanding, and it is possible to flexibly cope with various requests in the field of use. However, in the battery pack disclosed in the above patent application Laid-Open Gazette, there is no description about technology that connects a plurality of battery packs and charges or discharges the battery packs.

Therefore, an object of the present disclosure is to provide an electric storage unit group configured by a plurality of battery packs (electric storage units) connected in a desired form, a charger, an electronic device, and an electric vehicle, each of which includes the electric storage unit group, a method for charging the electric storage unit group, a method for discharging the electric storage unit group, a method for supplying and receiving power, and a method for determining a charging/discharging route in the electric storage unit group.

Solutions to Problems

According to a first aspect of the present disclosure for achieving the above object, there is provided an electric storage unit group including:

a plurality of electric storage units having rechargeable battery cells and linearly or reticulately connected, wherein, at an upstream side of the electric storage unit group, the electric storage unit group is connected to a power supply for charging the electric storage units, and when a rechargeable battery cell constituting a single electric storage unit is fully charged, a charging of the single electric storage unit is stopped, and an electric storage unit connected to a more downstream side than the single electric storage unit is charged through the single electric storage unit.

According to a second aspect of the present disclosure for achieving the above object, there is provided an electric storage unit group including:

a plurality of electric storage units having rechargeable battery cells and linearly or reticulately connected, wherein, at a downstream side of the electric storage unit group, the electric storage unit group is connected to a load, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

According to the first aspect of the present disclosure for achieving the above object, there is provided a charger including:

an electric storage unit group in which a plurality of electric storage units having rechargeable battery cells are linearly or reticulately connected, wherein, at an upstream side of the electric storage unit group, the electric storage unit group is connected to a power supply for charging the electric storage units, and when a rechargeable battery cell constituting a single electric storage unit is fully charged, a charging of the single electric storage unit is stopped, and an electric storage unit connected to a more downstream side than the single electric storage unit is charged through the single electric storage unit.

According to the second aspect of the present disclosure for achieving the above object, there is provided a charger including:

an electric storage unit group in which a plurality of electric storage units having rechargeable battery cells are linearly or reticulately connected, wherein, at a downstream side of the electric storage unit group, the electric storage unit group is connected to a load, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

According to the first aspect of the present disclosure for achieving the above object, there is provided an electronic device including:

an electric storage unit group in which a plurality of electric storage units having rechargeable battery cells are linearly or reticulately connected; and an electronic component that receives power from the electric storage unit group, wherein the electric storage unit group is connected to a power supply for charging the electric storage units at an upstream side of the electric storage unit group, and is connected to the electronic component at a downstream side of the electric storage unit, and when a rechargeable battery cell constituting a single electric storage unit is fully charged, a charging of the single electric storage unit is stopped, and an electric storage unit connected to a more downstream side than the single electric storage unit is charged through the single electric storage unit.

According to the second aspect of the present disclosure for achieving the above object, there is provided an electronic device including:

an electric storage unit group in which a plurality of electric storage units having rechargeable battery cells are linearly or reticulately connected; and an electronic component that receives power from the electric storage unit group, wherein, at a downstream side of the electric storage unit group, the electric storage unit group is connected to the electronic component, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

According to the first aspect of the present disclosure for achieving the above object, there is provided an electric vehicle including:

an electric storage unit group in which a plurality of electric storage units having rechargeable battery cells are linearly or reticulately connected;

a power generator; and a power/driving force converter, wherein the electric storage unit group is connected to the power generator for charging the electric storage units at an upstream side of the electric storage unit group, and is connected to the power/driving force converter at a downstream side of the electric storage unit group, and when a rechargeable battery cell constituting a single electric storage unit is fully charged, a charging of the single electric storage unit is stopped, and an electric storage unit connected to a more downstream side than the single electric storage unit is charged through the single electric storage unit.

According to the second aspect of the present disclosure for achieving the above object, there is provided an electric vehicle including:

an electric storage unit group in which a plurality of electric storage units having rechargeable battery cells are linearly or reticulately connected;

a power generator; and a power/driving force converter, wherein the electric storage unit group is connected to the power generator for charging the electric storage units at an upstream side of the electric storage unit group, and is connected to the power/driving force converter at a downstream side of the electric storage unit group, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

According to the present disclosure for achieving the above object, there is provided a method for charging a rechargeable battery cell in an electric storage unit group in which a plurality of electric storage units having rechargeable battery cells are linearly or reticulately connected, wherein, at an upstream side of the electric storage unit group, the electric storage unit group is connected to a power supply for charging the electric storage units, and the method includes a charging process of, when a rechargeable battery cell constituting a single electric storage unit is fully charged, stopping charging the single electric storage unit, and charging an electric storage unit connected to a more downstream side than the single electric storage unit through the single electric storage unit.

According to the present disclosure for achieving the above object, there is provided a method for discharging a rechargeable battery cell in an electric storage unit group in which a plurality of electric storage units having rechargeable battery cells are linearly or reticulately connected, wherein, at a downstream side of the electric storage unit group, the electric storage unit group is connected to a load, and the method includes a discharging process of, when a voltage of a rechargeable battery cell constituting a single electric storage unit becomes equal to or lower than a predetermined voltage, stopping discharging from the single electric storage unit, and starting discharging an electric storage unit connected to an upstream side of the single electric storage unit.

According to the first aspect of the present disclosure for achieving the above object, there is provided a method for supplying and receiving power, for achieving which supplies power from an electric storage unit group in which a plurality of electric storage units having rechargeable battery cells are linearly or reticulately connected, and receives power from a power generator and a power distribution grid, wherein the electric storage unit group is connected to the power generator for charging the electric storage units through the power distribution grid at an upstream side of the electric storage unit group, and is connected to a load at a downstream side of the electric storage unit group, and the method includes a charging process of, when a rechargeable battery cell constituting a single electric storage unit is fully charged, stopping charging the single electric storage unit, and charging an electric storage unit connected to a more downstream side than the single electric storage unit through the single electric storage unit.

According to the second aspect of the present disclosure for achieving the above object, there is provided a method for supplying and receiving power, which supplies power from an electric storage unit group in which a plurality of electric storage units having rechargeable battery cells are linearly or reticulately connected, and receives power from a power generator and a power distribution grid, wherein the electric storage unit group is connected to the power generator for charging the electric storage units through the power distribution grid at an upstream side of the electric storage unit group, and is connected to a load at a downstream side of the electric storage unit group, and the method includes a discharging process of, when a voltage of a rechargeable battery cell constituting a single electric storage unit becomes equal to or lower than a predetermined voltage, stopping discharging from the single electric storage unit, and starting discharging an electric storage unit connected to an upstream side of the single electric storage unit.

According to the present disclosure for achieving the above object, there is provided a method for determining a charging/discharging route in an electric storage unit group, in which a plurality of electric storage units having rechargeable battery cells are linearly or reticulately connected; at an upstream side of the electric storage unit group, the electric storage unit group is connected to a power supply for charging the electric storage units; and, at a downstream side of the electric storage unit group, the electric storage unit group is connected to a load, wherein when the number of electric storage units constituting the electric storage unit group is N, an N-th order square matrix A is calculated, a case where a value of an element [i, j] of the N-th order square matrix A (where $1 \leq i \leq N$, $1 \leq j \leq N$) is 0 represents that an i-th electric storage unit and a j-th electric storage unit are not connected to each other, and a case where the value of the element [i, j] of the N-th order square matrix A is 1 represents that the i-th electric storage unit and the j-th electric storage unit are connected to each other, in a matrix $A^m$, which is the m-th power of the N-th order square matrix A, by calculating a minimum m value, at which the value of the element [i, j] is nonzero, the number of electric storage units existing from the i-th electric storage unit to the j-th electric storage unit is calculated as (m−1), when m=1, the j-th electric storage unit from the i-th electric storage unit is determined as a charging/discharging route, when m≥2, by calculating a minimum $k_{m'+1}$ at which an element [i, $k_{m'+1}$] (where, m'=1, 2, 3 ..., m−1, and $k_1$=j) in a matrix $A^{m-m'}$, which is the (m−m')-th power of the N-th order square matrix A, and an element [$k_{m'+1}$, $k_{m'}$] in the N-th order square matrix A are nonzero at the same time, a $k_{m'+1}$-th electric storage unit is designated as an electric storage unit that is one ahead of the $k_m$-th electric storage unit in electric storage units existing from the i-th electric storage unit to the $k_m$-th electric storage unit, the operation is repeated until the value of m' becomes (m−1) from 1, and the electric storage units existing from the i-th electric storage unit to the j-th electric storage unit are designated, and the operation is performed on the entire electric storage units to determine the charging/discharging route from the i-th electric storage unit to the j-th electric storage unit.

Effects of the Invention

The method for charging the electric storage unit group of the present disclosure or the method for supplying and receiving power according to the first aspect of the present disclosure include a charging process of, when a rechargeable battery cell constituting a single electric storage unit is fully charged, stopping charging the single electric storage unit, and charging an electric storage unit connected to a more downstream side than the single electric storage unit through the single electric storage unit. Therefore, it is possible to surely perform the charging of the electric storage units in the electric storage unit group in which a plurality of electric storage units having rechargeable battery cells are linearly or reticulately connected. Furthermore, in the charging of the electric storage units, it is possible to surely prevent the occurrence of the charging loop on the charging route within the electric storage unit group, and it is possible to set a flexible charging method and an optimal charging route.

The method for discharging the electric storage unit group of the present disclosure or the method for supplying and receiving power according to the second aspect of the present includes a discharging process of, when a voltage of a rechargeable battery cell constituting a single electric storage unit becomes equal to or lower than a predetermined voltage, stopping discharging from the single electric storage unit, and starting discharging an electric storage unit connected to an upstream side of the single electric storage unit. Therefore, it is possible to surely perform the discharging of the electric storage units in the electric storage unit group in which a plurality of electric storage units having rechargeable battery cells are linearly or reticulately connected. Furthermore, in the discharging of the electric storage units, it is possible to surely prevent the occurrence of the discharging loop on the discharging route within the electric storage unit group, and it is possible to set a flexible discharging method and an optimal discharging route. Also, it is possible to safely and efficiently use a clustered electric storage unit. Hence, like the use of the charging method at an executing place and the use of the charging method other places, the charging method can be used in a single type of specification, without limitation to point of use.

In the electric storage unit group, the charger, the electronic device, or the electric vehicle according to the first aspect of the present disclosure, when a rechargeable battery cell constituting a single electric storage unit is fully charged, the charging of the single electric storage unit is stopped, and an electric storage unit connected to a more downstream side than the single electric storage unit is charged through the single electric storage unit. Therefore, it is possible to surely perform the charging of the electric storage units. Furthermore, in the charging of the electric storage units, it is possible to surely prevent the occurrence of the charging loop on the charging route within the electric storage unit group, and it is possible to set a flexible charging method and an optimal charging route.

In the electric storage unit group, the charger, the electronic device, or the electric vehicle according to the second aspect of the present disclosure, when a voltage of a rechargeable battery cell constituting a single electric storage unit becomes equal to or lower than a predetermined voltage, the discharging from the single electric storage unit is stopped, and the discharging of an electric storage unit connected to an upstream side of the single electric storage unit is started. Therefore, it is possible to surely perform the discharging of the electric storage units. Furthermore, in the discharging of the electric storage units, it is possible to surely prevent the occurrence of the discharging loop on the discharging route within the electric storage unit group, and it is possible to set a flexible discharging method and an optimal discharging route. Also, it is possible to safely and efficiently use a clustered electric storage unit. Hence, like the use of the charging method at an executing place and the use of the charging method other places, the charging method can be used in a single type of specification, without limitation to point of use.

The method for determining the charging/discharging route in the electric storage unit group of the present disclosure is a simple method, but can surely determine the shortest charging/discharging route in the electric storage unit group.

Additional features and advantages are described herein, and will be apparent from the following Detailed Description and the figures.

BRIEF DESCRIPTION OF THE FIGURES

FIG. 1(A) is a diagram illustrating a power route in a method for charging an electric storage unit group according to a first embodiment, and FIG. 1(B) is a diagram illustrating a power route in a method for charging an electric storage unit group according to a second embodiment.

DETAILED DESCRIPTION

Figure 1:
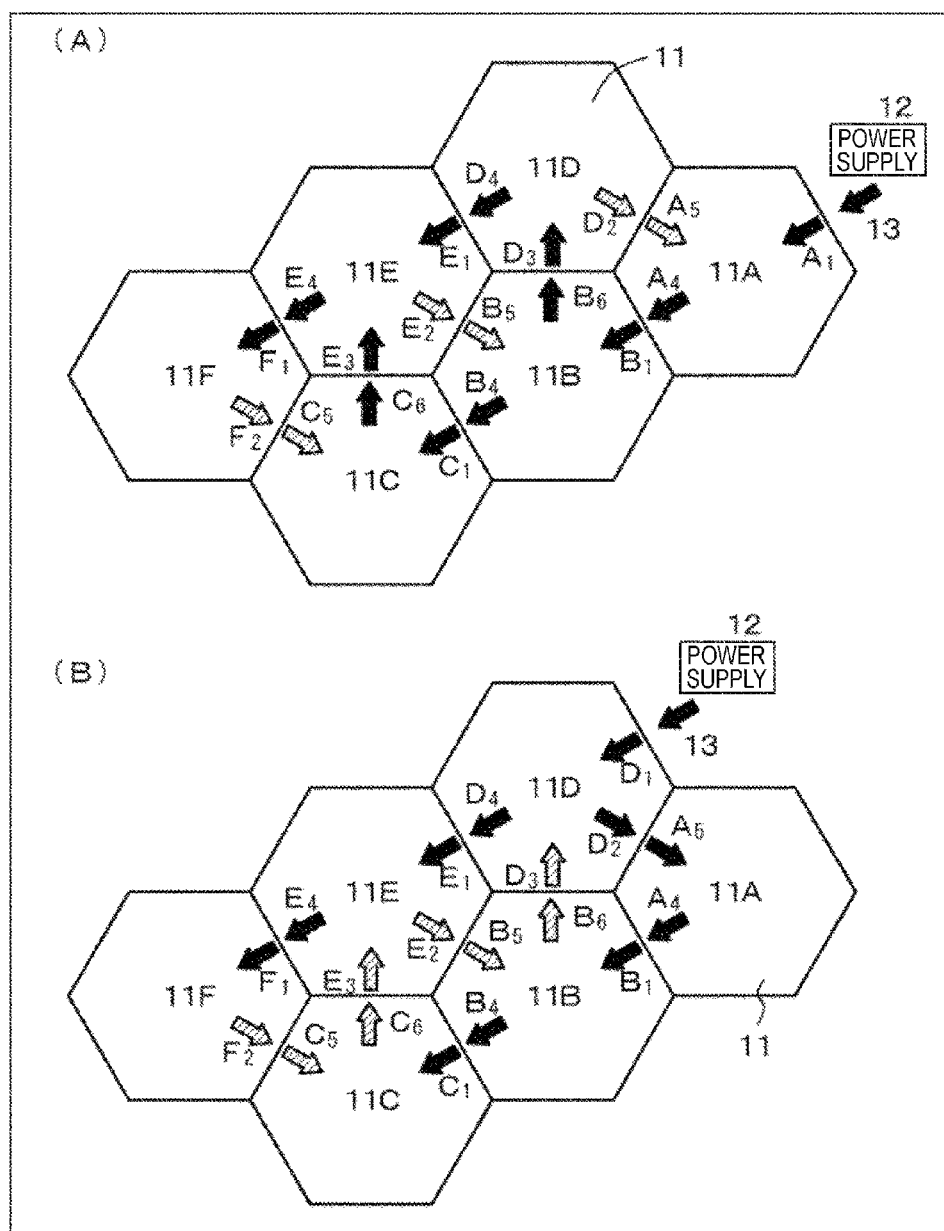
FIGS. 1(A) and 1(B) are schematic diagrams viewed from above electric storage unit groups configured by a combination of six electric storage units according to the present disclosure.

Hereinafter, the present disclosure will be described based on embodiments with reference to the drawings, but the present disclosure is not limited to the embodiments. A variety of numbers or materials in the embodiments are exemplary. Also, the description is given in the following order.

1. Overall description about electric storage unit group, charger, electronic device, electric vehicle, method for charging the electric storage unit group, method for discharging the electric storage unit group, method for supplying and receiving power, and method for determining a charging/discharging route in the electric storage unit group, according to the present disclosure 2. First embodiment (electric storage unit group and method for charging the electric storage unit group according to first aspect of the present disclosure, charger and electronic device according to first aspect of the present disclosure, and method for supplying and receiving power according to first aspect of the present disclosure)

3. Second embodiment (Modification of first embodiment)

4. Third embodiment (modification of first embodiment)

5. Fourth embodiment (electric storage unit group and method for discharging the electric storage unit group according to second aspect of the present disclosure, charger and electronic device according to second aspect of the present disclosure, and method for supplying and receiving power according to second aspect of the present disclosure)

6. Fifth embodiment (modification of fourth embodiment)

7. Sixth embodiment (another modification of fourth embodiment)

8. Seventh embodiment (yet another modification of fourth embodiment)

9. Eighth embodiment (method for determining charging/discharging route in electric storage unit group)

10. Ninth embodiment (electric vehicles according to first aspect and second aspect of the present disclosure), and others

[Overall Description about Electric Storage Unit Group, Charger, Electronic Device, Electric Vehicle, Method for Charging the Electric Storage Unit Group, Method for Discharging the Electric Storage Unit Group, Method for Supplying and Receiving Power, and Method for Determining Charging/Discharging Route in the Electric Storage Unit Group, According to the Present Disclosure]

In a method for charging an electric storage unit group of the present disclosure, it is preferable that a charging process is repeated until rechargeable battery cells constituting the entire electric storage units are fully charged.

An electric storage unit group according to the first aspect of the present disclosure may be configured such that each electric storage unit includes a short circuit, and, when a rechargeable battery cell constituting a single electric storage unit is fully charged, an electric storage unit connected to a downstream side of the single electric storage unit is charged through a short circuit of the single electric storage unit. Also, in the method for charging the electric storage unit group of the present disclosure, which includes the preferred form, it may be configured such that each electric storage unit includes a short circuit, and, when a rechargeable battery cell constituting a single electric storage unit is fully charged during a charging process, an electric storage unit connected to a downstream side of the single electric storage unit is charged through a short circuit of the single electric storage unit.

In addition, in the electric storage unit group of the present disclosure, which includes the preferred configuration, or in the method for charging the electric storage unit group of the present disclosure, which includes the preferred form and configuration, it is preferable that the outflow of power to the electric storage unit connected to the downstream side of the single electric storage unit is prohibited until the single electric storage unit is fully charged, or it is preferable to prohibit the outflow of power.

In a method for discharging the electric storage unit group of the present disclosure, it is preferable that a discharging process is repeated until a voltage of rechargeable battery cells constituting the entire electric storage units becomes equal to or lower than a predetermined voltage.

An electric storage unit group according to the second aspect of the present disclosure may be configured such that each electric storage unit includes a short circuit, and, when a voltage of a rechargeable battery cell constituting a single electric storage unit becomes equal to or lower than a predetermined voltage, a discharging of an electric storage unit connected to an upstream side of the single electric storage unit is started through a short circuit of the single electric storage unit. Also, in the method for discharging the electric storage unit group of the present disclosure, which includes the preferred form, it may be configured such that each electric storage unit includes a short circuit, and, when a voltage of a rechargeable battery cell constituting a single electric storage unit becomes equal to or lower than a predetermined voltage during a discharging process, a discharging of an electric storage unit connected to an upstream side of the single electric storage unit is started through a short circuit of the single electric storage unit.

In addition, in the electric storage unit group according to the second aspect of the present disclosure, which includes the preferred configuration, or in the method for discharging the electric storage unit group of the present disclosure, which includes the preferred form and configuration, it is preferable that a discharging from the electric storage unit connected to the upstream side of the single electric storage unit during a discharging from the single electric storage unit is prohibited, or it is preferable to prohibit the discharging.

In addition, in the electric storage unit group according to the second aspect of the present disclosure, which includes the preferred form and configuration, or in the method for discharging the electric storage unit group of the present disclosure, it may be configured such that the electric storage unit group is connected to a power supply for charging an electric storage unit at an upstream side of the electric storage unit group, and, when a rechargeable battery cell constituting a single electric storage unit is fully charged, the charging of the single electric storage unit is stopped, or the charging is stopped, and the electric storage unit connected to a more downstream side than the single electric storage unit is charged through the single electric storage unit, or the charging process for charging the electric storage unit is provided. That is, either the electric storage unit group according to the first aspect of the present disclosure, which includes the preferred form and configuration, or the method for charging the electric storage unit group of the present disclosure, and either the electric storage unit group according to the second aspect of the present disclosure, which includes the preferred form and configuration, or the method for discharging the electric storage unit group of the present disclosure may be appropriately combined with each other.

Furthermore, in the electric storage unit group according to the first aspect of the present disclosure, which includes the above-described preferred form and configuration, or in the method for charging or discharging the electric storage unit group of the present disclosure, the electric storage unit may include, but is not limited to:

(A) a housing having a polygonal prism shape,
(B) rechargeable battery cells stored in the housing,
(C) a charging/discharging control unit stored in the housing and connected to the rechargeable battery cell,
(D) at least one power input unit disposed in the housing and connected to the charging/discharging control unit, and
(E) at least one power output unit disposed in the housing and connected to the charging/discharging control unit. Also, for convenience, the electric storage unit having such a configuration will be referred to as "electric storage unit of the present disclosure".

The housing of the electric storage unit of the present disclosure has a polygonal prism shape, and a plurality of electric storage units can be combined. Furthermore, since at least one power input unit and at least one power output unit are disposed in the housing, a plurality of electric storage units may be easily combined by connecting power input units and power output units of adjacent electric storage units. Furthermore, for example, a plurality of electric storage units having different capacities may be used as a single electric storage unit group as a whole by combining the plurality of electric storage units, that is, in a mixed state. Therefore, the field of use of the electric storage unit is expanding, and it is possible to flexibly cope with various requests in the field of use. Moreover, for example, a plurality of electric storage units having different degrees of deterioration and different charge cycles may be used as a single electric storage unit group as a whole by combining the plurality of electric storage units, that is, in a mixed state. Therefore, a single electric storage unit group as a whole may be constructed by using rechargeable battery cells having different capacities and voltages.

The electric storage unit group according to the first or second aspect of the present disclosure, which includes the above-described various preferred forms and configurations, can be applied to a charger according to a first or second aspect of the present disclosure, an electronic device according to a first or second aspect of the present disclosure, and an electric vehicle according to a first or second aspect of the present disclosure, and can be applied to a method for charging the electric storage unit group of the present disclosure, a method for discharging the electric storage unit group of the present disclosure, and a method for supplying and receiving power and a method for determining a charging/discharging route in the electric storage unit group according to a first or second aspect of the present disclosure.

There is no special limitation to the number of power supply units in the electric storage unit group, the charger, the electronic device, the electric vehicle, the method for charging the electric storage unit group, the method for discharging the electric storage unit group, the method for supplying and receiving power, and the method for determining a charging/discharging route in the electric storage unit group according to the first or second aspect of the present disclosure, which includes the above-described various preferred forms and configurations, (hereinafter, these may also be referred to as the present disclosure for simplicity). In the present disclosure, the upstream side and the downstream side of the electric storage unit group refer to a side through which a current flows in and a side through which a current flows out, respectively, when viewing the electric storage unit group as a whole. Also, the upstream side and the downstream side of the electric storage unit group refer to a side through which a current flows into the electric storage unit and a side through which a current flows out from the electric storage unit. In the method for discharging the electric storage unit group of the present disclosure, the predetermined voltage may be 12 V as one example, but is not limited thereto.

In the present disclosure, the electric storage unit group is connected to a power consuming device. However, one or more power consuming devices may be connected to a single place of the electric storage unit group, or one or more power consuming devices may be connected to a plurality of places of the electric storage unit group. The electric storage unit group and the power consuming device(s) may be connected by using wires, or may be connected by employing a wireless power transmission method (wireless power transmission circuit), such as an electromagnetic induction method or a magnetic resonance method. Examples of the power consuming devices may include electronic devices such as a personal computer, a television receiver, a variety of display devices, a mobile phone, a PDA, a digital still camera, a video camera, a camcorder, or a music player, electric tools such as an electric drill, lighting fixtures such as an interior lamp, electric storage units or home energy servers (electric storage devices for home use), medical devices, toys, and the like, but the power consuming devices are not limited thereto. Also, the electronic device of the present disclosure may be these power consuming devices, and electronic components provided in the electronic device may be known components constituting these electronic devices, and the electronic components are driven and operated by, for example, the electric storage unit group. Examples of the electric vehicle may include an electric automobile, an electric motorcycle, an electric bicycle, and Segway (registered trademark), and the electric storage unit group can also be applied to the driving of a power/driving force conversion device of an aircraft or vessel (specifically, for example, power motor) as well as the driving of a power/driving force conversion device of the electric vehicle (specifically, for example, power motor). Examples of the power supply in the present disclosure may include a commercial power supply, a power generator, a power distribution grid, and a smart grid (next-generation power distribution grid). Examples of the power generator may include various solar cells, fuel cells, wind power generators, hydroelectric power generators, and geothermal power generators, but the power generator is not limited thereto. The power generator may be connected to a single place of the electric storage unit group, or may be connected to a plurality of places of the electric storage unit group. Also, the number of the power generators is not limited to one, but may be multiple. The electric storage unit group and the power consuming device(s) may be connected by using wires, or may be connected by employing a wireless power transmission method (wireless power transmission circuit), such as an electromagnetic induction method or a magnetic resonance method.

In the electric storage unit of the present disclosure, the charging/discharging control unit may include an integrated circuit for charging/discharging control and a DC/DC converter. By including the DC/DC converter in the charging/discharging control unit, an output voltage of the electric storage unit can be stably output as a constant voltage to the exterior. Also, the integrated circuit for charging/discharging control and the DC/DC converter, in themselves, may be configured by a known integrated circuit for charging/discharging control and a known DC/DC converter.

The electric storage unit of the present disclosure, which includes the preferred form, may further include:

(F) at least one information input unit disposed in the housing and connected to the charging/discharging control unit, and (G) at least one information output unit disposed in the housing and connected to the charging/discharging control unit. By employing such a configuration, if all of a plurality of electric storage units are connected to a controller by a communication unit, the controller can control the plurality of electric storage units, transmit/receive or exchange information among the plurality of electric storage units, check operating conditions of the plurality of electric storage units, and display the operating conditions of the plurality of electric storage units. Also, the power input unit may also be configured to serve as the information input unit, and the power output unit may also be configured to serve as the information output unit.

In the case where the electric storage units are connected to the controller by the communication unit, or in the case where the electric storage units are connected to one another by the communication unit, examples of the communication unit may include a typical telephone line or optical fiber line including an Internet communication network, ZigBee, Wireless, LAN, RC232, USB, infrared light including IrDA, Bluetooth that is one of wireless LAN protocols, HomeRF, or a combination thereof, but the communication unit is not limited thereto. A personal computer may be used as the controller or a part of the controller. Also, a mobile terminal with a display device may be further included, and the controller and the mobile terminal may be connected by the communication unit. Due to such a configuration, the operating condition of the electric storage unit or the electric storage unit group can be checked at a distant place. Examples of the mobile terminal may include a mobile phone, a Personal Digital Assistant (PDA), and a notebook persona computer, but the mobile terminal is not limited thereto.

In the electric storage unit of the present disclosure, which includes the preferred form and configuration, the power input unit may be configured by a USB terminal portion, and the power output unit may be configured by a USB terminal portion into which the power input unit configured by the USB terminal portion is fitted. Alternatively, in the electric storage unit of the present disclosure, which includes the preferred form having the above-described configuration with at least one information input unit and at least one information output unit, the power input unit and the power output unit may be configured by the wireless power transmission circuit. Specifically, examples of the wireless power transmission circuit (wireless power transmission method) may include the above-described various methods, but the wireless power transmission circuit (wireless power transmission method) is not limited thereto.

In the electric storage unit of the present disclosure, which includes the above-described various preferred forms and configurations, it is preferable that the housing is shaped such that a plurality of housings can be arranged without any gap therebetween. Specifically, examples of a cross-sectional shape when cutting the housing on a virtual plane perpendicular to an axis line of the housing having a polygonal prism shape may include: a triangle including an equilateral triangular prism; a quadrangle including a square, a rectangle, and a parallelogram; a regular hexagon; and an arbitrary shape surrounded by a line or curve. Also, when the cross-sectional shape is a square or a rectangle, the shape of the housing can also be referred to as a cube or a cuboid. The housing may be made of, for example, a plastic material, for example, a thermoplastic resin. Specifically, the housing may be made of, for example, a polyolefin-based resin, such as a polyethylene resin and a polypropylene resin; a polyamide-based resin, such as polyamide 6, polyamide 66, and polyamide MXD6; a polyoxymethylene (polyacetal, POM) resin; a polyester-based resin, such as a polyethylene terephthalate (PET) resin and a polybutylene terephthalate (PBT) resin; polyphenylene sulfide resin; a styrene-based resin, such as a polystyrene resin, an ABS resin, an AES resin, and an AS resin; a methacrylate-based resin; a polycarbonate resin; a modified polyphenylene ether (PPE) resin; a polysulfone resin; a polyethersulfone resin; a polyacrylate resin; a polyether-imide resin; a polyamide-imide resin; a polyimide-based resin; a polyether ketone resin; a polyether ether ketone resin; a polyester carbonate resin; and a liquid crystal polymer, but the material of the housing is not limited thereto.

Alternatively, in the electric storage unit of the present disclosure, which includes the above-described various preferred forms and configurations, it is preferable that the housing is configured to have a regular hexagonal prism shape. In this case, the power input unit may be provided on an odd-numbered lateral face of the housing having the regular hexagonal prism shape, and the power output unit may be provided on an even-numbered lateral face of the housing having the regular hexagonal prism shape. Also, the power input unit may be provided on all or part of the odd-numbered lateral faces of the housing having the regular hexagonal prism shape. Likewise, the power output unit may be provided on all or part of the even-numbered lateral faces of the housing having the regular hexagonal prism shape.

In the electric storage unit of the present disclosure, which includes the above-described various preferred forms and configurations, an input display unit connected to the charging/discharging control unit to display the presence or absence of power input may be disposed near the power input unit, and an output display unit connected to the charging/discharging control unit to display the presence or absence of power output may be disposed near the power output unit. In this case, the input display unit and the output display unit may include a display unit made of an arrow-shaped light transmissive member, and a light emitting element disposed inside the display unit. Furthermore, the input display unit and the output display unit may be disposed on the top face of the housing.

In the electric storage unit of the present disclosure, which includes the above-described various preferred forms and configurations, as an arrangement type of the electric storage unit, a plurality of electric storage units may be combined by connecting the power input units and the power output units of the adjacent electric storage units. In this manner, the electric storage unit group is constituted. The plurality of electric storage units may be combined in a planar fashion to constitute the electric storage unit group, or the plurality of electric storage units may be combined three-dimensionally or by stacking to constitute the electric storage unit. Alternatively, the plurality of electric storage units may be combined in a planar fashion and combined three-dimensionally (or by stacking). The capacity and size of the electric storage units constituting the electric storage unit group, and the number, output voltage or capacity of the rechargeable battery cells constituting the electric storage unit may be equal to or different from each other in the electric storage units.

First Embodiment

Figure 2:
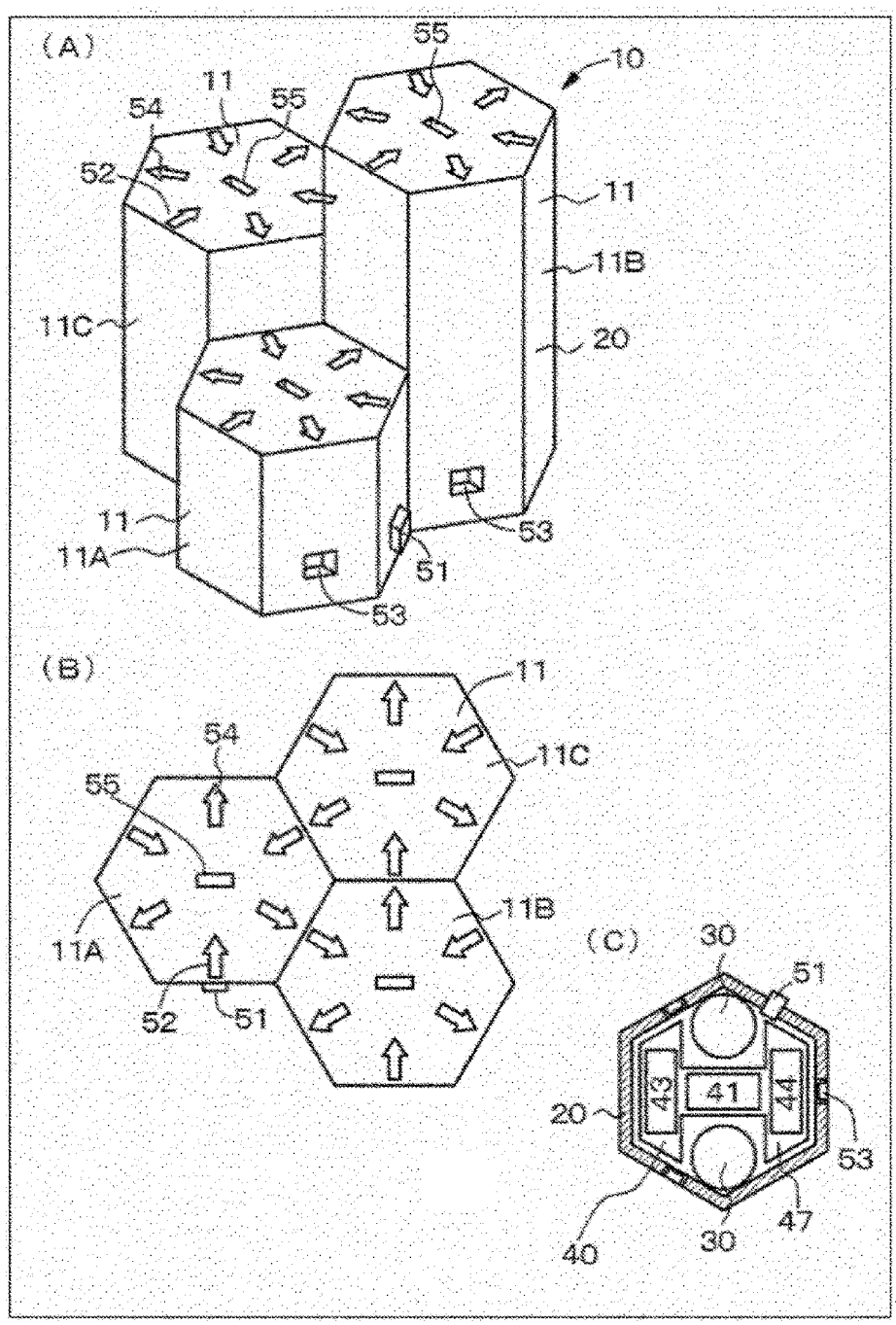
FIGS. 2(A), 2(B) and 2(C) are a schematic perspective view of an electric storage unit group configured by a combination of three electric storage units according to the present disclosure, a schematic diagram viewed from above the electric storage unit group, and a schematic diagram illustrating the interior of the electric storage unit, respectively.
Figure 3:
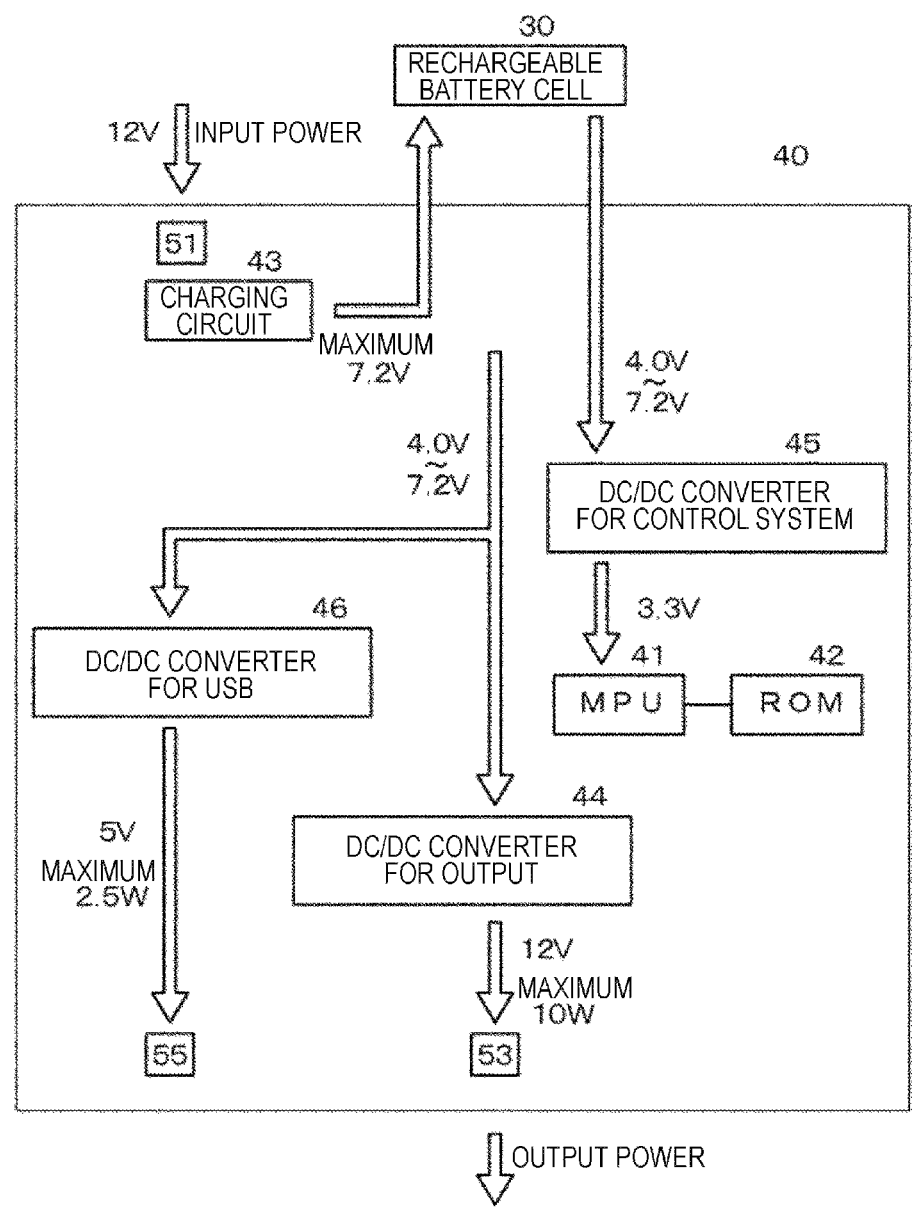
FIG. 3 is a block diagram of a rechargeable battery cell and a charging/discharging control unit of an electric storage unit according to the present disclosure.

A first embodiment relates to an electric storage unit group, a charger, and an electronic device according to the first aspect of the present disclosure, and a method for charging the electric storage unit group of the present disclosure and a method for supplying and receiving power according to the first aspect of the present disclosure. FIG. 1(A) is a schematic diagram viewed from above an electric storage unit group configured by a combination of six electric storage units of the present disclosure, and illustrates a power route in a method for charging the electric storage unit group according to a first embodiment and a method for supplying and receiving power according to a first embodiment. Also, FIG. 2(A) is a schematic perspective view of an electric storage unit group configured by a combination of three electric storage units in the first embodiment, FIG. 2(B) is a schematic diagram viewed from above the electric storage unit group, and FIG. 2(C) is a schematic diagram illustrating the interior of the electric storage unit. Also, FIG. 3 is a block diagram of a charging/discharging control unit.

The electric storage unit group of the first embodiment is an electric storage unit group 10 in which a plurality of electric storage units 11 having rechargeable battery cells 30 are linearly or reticulately connected. At an upstream side of the electric storage unit group 10, the electric storage unit group 10 is connected to a power supply for charging the electric storage units 11. When the rechargeable battery cell 30 constituting a single electric storage unit 11 is fully charged, the charging of the single electric storage unit 11 is stopped, and an electric storage unit 11 connected to a more downstream side than the single electric storage unit 11 is charged through the single electric storage unit 11.

Also, the electric storage unit group of the first embodiment is an electric storage unit group 10 in which a plurality of electric storage units 11 having rechargeable battery cells 30 are linearly or reticulately connected. At an upstream side of the electric storage unit group 10, the electric storage unit group 10 is connected to a power supply for charging the electric storage units 11. When the rechargeable battery cell 30 constituting a single electric storage unit 11 is fully charged, the charging of the single electric storage unit 11 is stopped, and an electric storage unit 11 connected to a more downstream side than the single electric storage unit 11 is charged through the single electric storage unit 11.

Also, the electronic device of the first embodiment is an electronic device including: an electric storage unit group 10 in which a plurality of electric storage units 11 having rechargeable battery cells 30 are linearly or reticulately connected; and an electronic component that receives power from the electric storage unit group 10. At an upstream side of the electric storage unit group 10, the electric storage unit group 10 is connected to a power supply for charging the electric storage units 11. At a downstream side of the electric storage unit group 10, the electric storage unit group 10 is connected to the electronic component. When the rechargeable battery cell 30 constituting a single electric storage unit 11 is fully charged, the charging of the single electric storage unit 11 is stopped, and an electric storage unit 11 connected to a more downstream side than the single electric storage unit 11 is charged through the single electric storage unit 11. Also, examples of the electronic device may include a personal computer, and examples of the electronic component provided in the electronic device may include a central processing unit. The electronic device of the first embodiment can also be equally applied to an electronic device of a fourth embodiment, which is to be described below.

In the first embodiment or second to ninth embodiments, which are to be described below, specifically, the electric storage unit group (power supply unit group) 10, as described above, includes a plurality of electric storage units (power supply units) 11 having rechargeable battery cells 30, and the electric storage units 11 are reticulately connected to one another. That is, in each embodiment, the electric storage unit group 10 includes a plurality of electric storage units 11 arranged in a planar fashion in a cluster shape.

Figure 6:
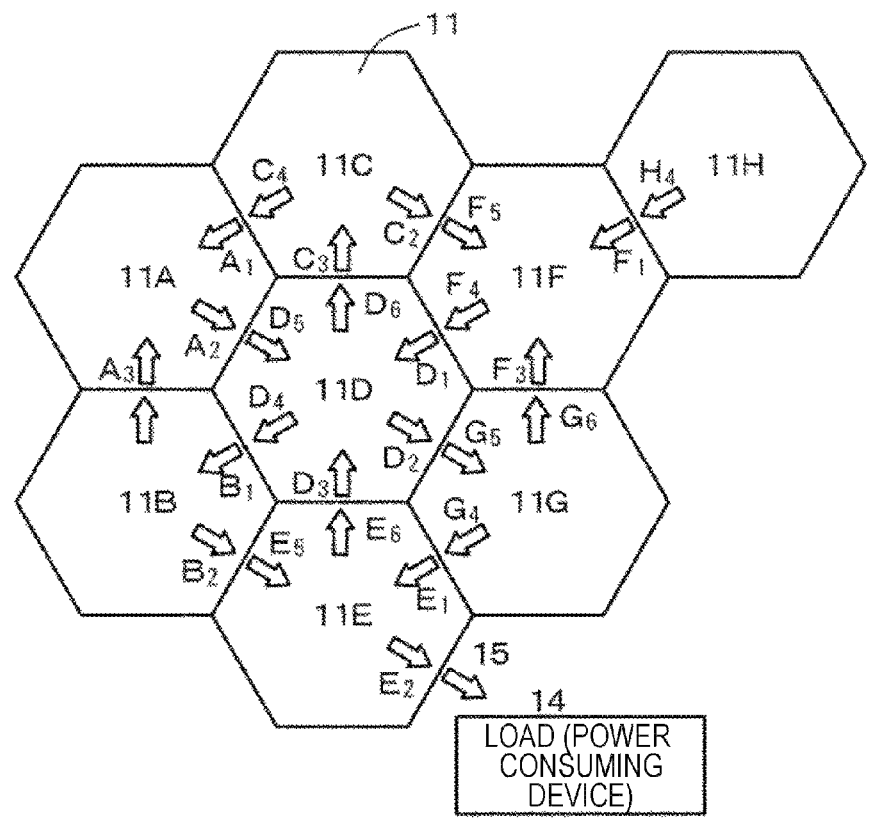
FIG. 6 is a diagram illustrating a power route in a method for discharging an electric storage unit group according to a seventh embodiment.
Figure 9:
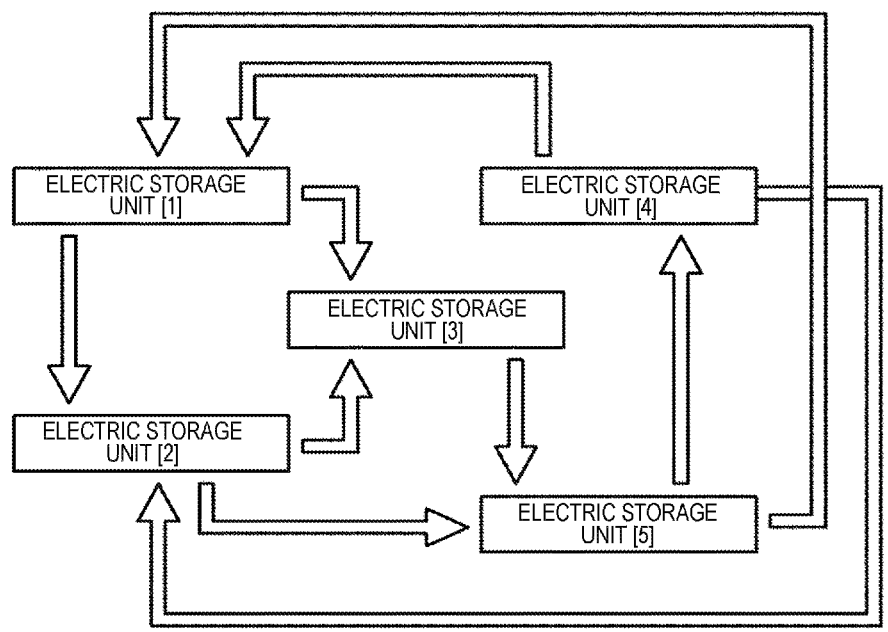
FIG. 9 is a diagram illustrating a power route in an electric storage unit group configured by a combination of six electric storage units according to an eighth embodiment.

The electric storage unit 11 of the first embodiment or the second to ninth embodiments, which are to be described below, includes:

(A) a housing 20 having a polygonal prism shape, (B) rechargeable battery cells 30 stored in the housing 20, (C) a charging/discharging control unit 40 stored in the housing 20 and connected to the rechargeable battery cells 30, (D) at least one power input unit 51 disposed in the housing 20 and connected to the charging/discharging control unit 40, and (E) at least one power output unit 53 disposed in the housing 20 and connected to the charging/discharging control unit 40. Also, in the first embodiment or the second to sixth embodiments, which are to be described below, the electric storage unit group 10, as illustrated in FIG. 1(A), is configured by a combination of six electric storage units 11A, 11B, 11C, 11D, 11E and 11F. In the seventh embodiment, which is to be described below, the electric storage unit group 10, as illustrated in FIG. 6, is configured by a combination of eight electric storage units. In the eighth embodiment, which is to be described below, the electric storage unit group 10, as illustrated in FIG. 9, is configured by a combination of five electric storage units. However, the number of the electric storage units is not limited thereto.

In the electric storage unit 11 of the first embodiment or the second to ninth embodiments, which are to be described below, the housing 20 is shaped such that a plurality of housings 20 can be arranged without any gap therebetween. Specifically, the housing 20 has a polygonal prism shape. That is, a cross-sectional shape when cutting the housing 20 on a virtual plane perpendicular to an axis line of the housing 20 is a regular hexagon. The power input unit 51 is provided on an odd-numbered lateral face of the housing 20 having a regular hexagonal prism shape, and the power output unit 53 is provided on an even-numbered lateral face of the housing 20 having a regular hexagonal prism shape. Also, in the illustrated example, the number of the power input units 51 and the number of the power output units 53 are three, respectively, but are not limited thereto. The power input unit 51 and the power output unit 53 are connected to the charging/discharging control unit 40 through wires that are not illustrated. Also, in FIG. 2(A), the three electric storage units 11 are different in height because the three electric storage units 11 are different in capacity, that is, a different number of the rechargeable battery cells 30 are stored in the housing 20. The housing 20 is made of a plastic material, such as an ABS resin.

The electric storage unit 11 of the first embodiment or the second to ninth embodiments, which are to be described below, further includes:

(F) at least one information input unit disposed in the housing 20 and connected to the charging/discharging control unit 40, and (G) at least one information output unit disposed in the housing 20 and connected to the charging/discharging control unit 40. Specifically, the information input unit and the information output unit are configured by USB terminal portions 55. More specifically, for example, the information input unit is configured by a USB terminal, and the information output unit is configured by an USB socket. The USB terminal portions 55 are connected to the charging/discharging control unit 40 through wires that are not illustrated. In the plurality of mutual electric storage units 11, information exchange between the mutual electric storage units 11 can be performed by connecting the information input unit and the information output unit by a USB cable.

In some cases, the power input unit 51 may be configured by a USB terminal portion, and the power output unit 53 may be configured by a USB terminal portion into which the power input unit 51 configured by the USB terminal portion is fitted. Specifically, for example, the power input unit 51 and the power output unit 53 may be configured by a micro USB terminal and a micro USB socket, respectively, or the power output unit 53 and the power input unit 51 may be configured by a micro USB terminal and a micro USB socket, respectively.

Also, each of the electric storage units 11 includes a short circuit (not illustrated). Specifically, each of the power input unit 51 and the power output unit 53 includes a short circuit. A conduction/non-conduction of the short circuit is controlled by the charging/discharging control unit 40. Specifically, for example, a switch circuit is provided in the short circuit, and an on/off operation of the switch circuit is controlled by the charging/discharging control unit 40. However, the present disclosure is not limited to such a configuration.

In the electric storage unit 11 of the first embodiment or the second to ninth embodiments, which are to be described below, the charging/discharging control unit 40 includes a known integrated circuit (charging circuit) 43 for charging/discharging control, and a known DC/DC converter (DC/DC converter for output) 44. The charging/discharging control unit 40 further includes an MPU 41, a storage unit 42 configured by an EEROM, a DC/DC converter 45 for control system, and a DC/DC converter 46 for USB. For example, the integrated circuit (charging circuit) 43 is supplied with input power of 12-V voltage from an external power supply, such as a commercial power supply or a solar cell, through the power input unit 51. By a known operation of the integrated circuit (charging circuit) 43, the rechargeable battery cell 30 configured by a rechargeable lithium-ion battery is charged. Power is supplied to the MPU 41 or the storage unit 42 from the rechargeable battery cell 30 through the DC/DC converter 45 for control system. Also, power is supplied to the exterior from the rechargeable battery cell 30 through the DC/DC converter 44 for output and the power output unit 53, and power is supplied from the rechargeable battery cell 30 to the USB terminal portion 55 through the DC/DC converter 46 for USB. Also, the MPU 41 and the like are mounted on a printed wiring board 47.

The power input unit 51 and the power output unit 53 are configured to be fitted into each other. Specifically, for example, the power input unit 51 has a protruding structure, and the power output unit 53 has a concave structure. The electric storage unit group 10 configured by a combination of the plurality of electric storage units 11 can be obtained by fitting the power input unit 51 into the power output unit 53 in the adjacent electric storage units 11. The charging/discharging control unit 40 is configured to detect a fitting state between the power input unit 51 and the power output unit 53 by a detection unit (for example, switch or the like) which is not illustrated.

Also, In the electric storage unit 11, an input display unit 52 connected to the charging/discharging control unit 40 to display the presence or absence of power input is disposed near the power input unit 51, and an output display unit 54 connected to the charging/discharging control unit 40 to display the presence or absence of power output is disposed near the power output unit 53. The input display unit 52 and the output display unit 54 include a display unit made of an arrow-shaped light transmissive member, and a light emitting element (not illustrated) disposed inside the display unit. Also, specifically, the light emitting element may be configured by, for example, an LED. The input display unit 52 and the output display unit 54 are disposed on the top face of the housing 20. The light emitting element is connected to the charging/discharging control unit 40 through wires, and an on/off operation of the light emitting element is controlled by the charging/discharging control unit 40. More specifically, the charging/discharging control unit 40 checks the fitting state between the power input unit 51 and the power output unit 53, detects a flow of current between the power input unit 51 and the power output unit 53, and performs an on/off control of the light emitting element, based on the result.

FIGS. 2(A) and 2(B) illustrate three input display units 52 and three output display units 54 in the single electric storage unit 11. On the other hand, FIGS. 1(A) and 1(B), FIGS. 5(A) and 5(B), and FIG. 6 illustrate only the input display units through which power flows in or can flow in, and the output display units through which power flows out or can flow out. Also, in FIGS. 1(A) and 1(B) and FIGS. 5(A) and 5(B), the input display units 52 indicated by black arrows show that power can be supplied (input) from the external power supply to the power input units 51 located near the input display units 52, and the output display units 54 indicated by black arrows show that power can be supplied (output) from the power output units 53 located near the output display units 54 to the exterior or the adjacent electric storage units 11. On the other hand, the input display units 52 indicated by hatched arrows show that power is prohibited from being supplied (input) from the external power supply to the power input units 51 located near the input display units 52, and the output display units 54 indicated by hatched arrows show that power is prohibited from being supplied (output) from the power output units 53 located near the output display units 54 to the exterior or the adjacent electric storage units 11.

In the housing 20 of the electric storage unit 11, a charging state display unit (not illustrated) configured by an LED to display a charging state and a discharging state display unit or remaining battery level display unit (not illustrated) configured by an LED to display a discharging state may be disposed. The charging state display unit and the discharging state display unit or remaining battery level display unit may be connected to the charging/discharging control unit 40, and the operations thereof may be controlled by the charging/discharging control unit 40. Alternatively, the input display unit 52 and the output display unit 54 may also serve as the charging state display unit and the discharging state display unit or remaining battery level display unit. In this case, for example, the functions as the charging state display unit and the discharging state display unit or remaining battery level display unit can be exhibited by a blinking state or the like of the light emitting element.

In the electric storage unit groups 10 of the first embodiment or the second to ninth embodiments, which are to be described below, or the chargers and the electronic devices including either of the electric storage unit groups 10, power is supplied from the external power supply through the power input unit 51 of a single place, and the rechargeable battery cells 30 of five, six or eight electric storage units 11 are charged. Power is supplied (output) to the power consuming device through the power output unit 53 of a single place, so that the power consuming device is driven. However, the present disclosure is not limited to such a configuration.

In the first embodiment or the second to ninth embodiments, which are to be described below, the shape of the housing 20 of the electric storage unit 11 may be a polygonal prism (specifically, regular hexagonal prism), and a plurality of electric storage units 11 can be combined without any gap therebetween. Also, a plurality of electric storage units 11 can be easily combined by connecting the power input units 51 and the power output units 53 of the adjacent electric storage units 11. For example, a plurality of electric storage units 11 having different capacities can be used as a single electric storage unit group 10 as a whole by combining the plurality of electric storage units, that is, in a mixed state.

On the other hand, in the electric storage unit groups 10 of the first embodiment or the second to ninth embodiments, which are to be described below, or the chargers and the electronic devices including either of the electric storage unit groups 10, permanent or temporary identification numbers (IDs) are assigned to the electric storage units 11. As the method of assigning the permanent identification numbers, a user may set a media access control (MAC) address or a DIP switch disposed in the electric storage unit. Also, as the method of assigning the temporary identification numbers, for example, the electric storage unit connected to the power supply or the electric storage unit connected to the power consuming device may be set as parent electric storage units, and the parent electric storage units may assign the identification numbers to other electric storage units. The controller, which is to be described below, may assign the identification numbers to the electric storage units.

In the electric storage unit group 10 of the first embodiment or the second to ninth embodiments, which are to be described below, if necessary, under the control of the charging/discharging control unit 40, each of the electric storage units 11 performs charging or discharging related processing for itself, and performs control of the short circuit, measures a remaining battery level, and evaluates the remaining battery level in n steps for itself. Furthermore, each of the electric storage units 11, if necessary, mutually transmits and exchanges identification number (ID), information about remaining battery level, already-charged ID history, uncharged ID history, already-discharged ID history, undischarged ID history, completion of charge start preparation, and the like.

In the electric storage unit group 10 of the first embodiment or the charger and the electronic device including the electric storage unit group 10, the electric storage unit group 10 is connected to a power supply 12 for charging the electric storage unit 11 at an upstream side of the electric storage unit group 10. Specifically, in the first embodiment, for example, the power input unit $A_1$ of the electric storage unit 11A is connected to the power supply 12. As the power supply 12, a commercial power supply may be used, and, for example, a solar cell may also be used. The electric storage unit group 10 and the power supply 12 may be connected by using a wire 13, or may be connected by employing a wireless power transmission method (wireless power transmission circuit), such as an electromagnetic induction method or a magnetic resonance method. The electric storage unit 11A is set as a parent electric storage unit, and the remaining five electric storage units 11B, 11C, 11D, 11E and 11F are set as child electric storage units. The charging/discharging control unit 40 performs a variety of processing. However, for convenience, the following description will be given in a way that the electric storage unit performs a variety of processing.

Also, when a new electric storage unit (for convenience, referred to as electric storage unit-A) is connected to the electric storage unit group, an electric storage unit (for convenience, referred to as electric storage unit-B) adjacent to the electric storage unit-A (that is, directly connected to the electric storage unit-A) generates a new identification number with reference to the identification numbers (IDs) of the entire electric storage units held by the electric storage unit group, assigns the identification number to the electric storage unit-A, and notifies the identification number of the parent electric storage unit to the electric storage unit-A. Therefore, the electric storage unit-A can know that the parent electric storage unit is already determined. The electric storage unit-A transmits a signal, which prompts the update of information, to the parent electric storage unit. The parent electric storage unit receiving the signal which prompts the update of information transmits a list of identification numbers of the entire electric storage units to the entire electric storage units.

When an electric storage unit (for convenience, referred to as electric storage unit-C) is removed from the electric storage unit group, an electric storage unit (for convenience, referred to as electric storage unit-D) adjacent to the electric storage unit-C (that is, directly connected to the electric storage unit-C) transmits a signal, which prompts the update of information, to the parent electric storage unit together with the identification number of the electric storage unit-C. The parent electric storage unit updates the list of identification numbers, and transmits the list of identification numbers to the entire electric storage units. In the case where the parent electric storage unit is removed, when an electric storage unit directly connected to the parent electric storage unit is multiple, an electric storage unit having the smallest identification number becomes a parent electric storage unit. When an electric storage unit directly connected to the parent electric storage unit is single, the directly connected electric storage unit becomes a parent electric storage unit. In this manner, a new unique parent electric storage unit can be determined. The new parent electric storage unit deletes the identification number of the original parent electric storage unit from the list of identification numbers, and transmits its own identification number to the entire electric storage units as the identification number of the parent electric storage unit.

Hereinafter, a method for charging an electric storage unit group according to a first embodiment and a method for supplying and receiving power according to a first embodiment will be described. However, as illustrated in a conceptual diagram of FIG. 4(A), the method for supplying and receiving power according to the first embodiment is a method for supplying and receiving power, which supplies power from an electric storage unit group 10 in which a plurality of electric storage units having rechargeable battery cells are linearly or reticulately connected, and receives power from a power generator and a power distribution grid (including a smart grid and a next-generation power distribution grid). At an upstream side of the electric storage unit group, the electric storage unit group 10 is connected to the power generator for charging the electric storage units through the power distribution grid. At a downstream side of the electric storage unit group, the electric storage unit group 10 is connected to a load (power consuming device) 14. The method for supplying and receiving power includes a charging process of: when a rechargeable battery cell constituting a single electric storage unit is fully charged, stopping the charging of the single electric storage unit; and charging an electric storage unit, connected to a more downstream side than the single electric storage unit, through the single electric storage unit. Also, reference numeral 15 denotes wires.

[Step-100]

An electric storage unit 11A serving as a parent electric storage unit inquires of five child electric storage units 11B, 11C, 11D, 11E and 11F about completion of charge start preparation. When the entire electric storage units 11A, 11B, 11C, 11D, 11E and 11F have completed the charge start preparation, the charging of the rechargeable battery cell 30 of the electric storage unit 11A is started.

In this state, the electric storage unit 11A corresponds to the single electric storage unit. Also, an electric storage unit having a power input unit 51 ($B_1$) connected to a power output unit 53 ($A_4$) of the electric storage unit 11A is only the electric storage unit 11B. Therefore, the electric storage unit 11B corresponds to the electric storage unit connected to the more downstream side than the single electric storage unit. The electric storage unit 11A stores 11B as the uncharged ID history. Also, the outflow of charging power to the electric storage unit 11B connected to the downstream side of the electric storage unit (single electric storage unit) 11A is prohibited until the electric storage unit (single electric storage unit) 11A is fully charged. Specifically, the outflow of power from the power output unit $A_4$ is prohibited.

[Step-110]

When the electric storage unit (single electric storage unit) 11A is fully charged, the charging of the electric storage unit 11A is stopped. The electric storage unit 11B connected to the more downstream side than the electric storage unit (single electric storage unit) 11A is charged through the electric storage unit (single electric storage unit) 11A.

Also, before the charging of the electric storage unit 11B is started, the short circuit of the electric storage unit (single electric storage unit) 11A is set to a conduction state. Specifically, the power input unit $A_1$ and the power output unit $A_4$ are set to a short-circuit state.

The entire electric storage units store 11A as the already-charged ID history, and the electric storage unit 11A selects an electric storage unit, based on the content 11B of the uncharged ID history, that is, the electric storage unit 11A selects the electric storage unit 11B. Then, the electric storage unit 11A starts the charging of the electric storage unit 11B. Also, the full charge of the electric storage unit 11A is notified to the parent electric storage unit 11A.

In this state, the electric storage unit 11B corresponds to the single electric storage unit. Also, electric storage units having power input units 51 ($C_1$, $D_3$) connected to power output units 53 ($B_4$, $B_6$) of the electric storage unit 11B are the electric storage unit 11C and the electric storage unit 11D. Therefore, the electric storage unit 11C and the electric storage unit 11D correspond to the electric storage unit connected to the more downstream side than the single electric storage unit. The electric storage unit 11B stores 11C and 11D as the uncharged ID history. Also, the outflow of charging power to the electric storage unit 11C and the electric storage unit 11D connected to the downstream side of the electric storage unit (single electric storage unit) 11B is prohibited until the electric storage unit (single electric storage unit) 11B is fully charged. Specifically, the outflow of power from the power output units $B_4$ and $B_6$ is prohibited.

[Step-120]

When the electric storage unit (single electric storage unit) 11B is fully charged, the charging of the electric storage unit 11B is stopped. The electric storage unit 11C and the electric storage unit 11D connected to the more downstream side than the electric storage unit (single electric storage unit) 11B are charged through the electric storage unit (single electric storage unit) 11B. Also, before the charging of the electric storage unit 11C and the electric storage unit 11D is started, the short circuit of the electric storage unit (single electric storage unit) 11B is set to a conduction state. Specifically, the power input unit $B_1$ and the power output unit $B_4$ are set to a short-circuit state, and the power input unit $B_1$ and the power output unit $B_6$ are set to a short-circuit state.

The entire electric storage units store 11A and 11B as the already-charged ID history, and the electric storage unit 11B selects an electric storage unit, based on the contents 11C and 11D of the uncharged ID history, that is, the electric storage unit 11B selects the electric storage unit 11C and the electric storage unit 11D. Then, the electric storage unit 11B notifies the parent electric storage unit 11A that the electric storage unit 11B is fully charged.

In this state, the electric storage unit 11C and the electric storage unit 11D correspond to the single electric storage unit. Also, an electric storage unit having a power input unit 51 ($E_3$) connected to a power output unit 53 ($C_6$) of the electric storage unit 11C is the electric storage unit 11E. On the other hand, electric storage units having power input units 51 ($A_5$, $E_1$) connected to power output units 53 ($D_2$, $D_4$) of the electric storage unit 11D are the electric storage unit 11A and the electric storage unit 11E.

Since 11A is contained in the already-charged ID history stored in the electric storage unit 11D, the electric storage unit 11E corresponds to the electric storage unit connected to the more downstream side than the single electric storage unit, but the electric storage unit 11A is excluded from the electric storage unit connected to the more downstream side than the single storage unit. That is, the electric storage unit, the charging of which has already been completed, is excluded from the electric storage unit connected to the more downstream side than the single electric storage unit. The same is applied to the following description. Also, in this manner, it is possible to prevent occurrence of charging loop in the charge route.

As described above, the electric storage unit 11E corresponds to the electric storage unit connected to the more downstream side than the single electric storage unit. The electric storage unit 11C and the electric storage unit 11D store 11E as the uncharged ID history. Also, the outflow of charging power to the electric storage unit 11E connected to the downstream side of the electric storage unit (single electric storage unit) 11C is prohibited until the electric storage unit (single electric storage unit) 11C is fully charged. Specifically, the outflow of power from the power output unit $C_6$ is prohibited. Likewise, the outflow of charging power to the electric storage unit 11E connected to the downstream side of the electric storage unit (single electric storage unit) 11D is prohibited until the electric storage unit (single electric storage unit) 11D is fully charged. Specifically, the outflow of power from the power output unit $D_4$ is prohibited.

[Step-130]

When the electric storage unit (single electric storage unit) 11C and the electric storage unit 11D are fully charged, the charging of the electric storage unit 11C and the electric storage unit 11D is stopped. The electric storage unit 11E connected to the more downstream side than the electric storage unit (single electric storage unit) 11C is charged through the electric storage unit (single electric storage unit) 11C. The electric storage unit 11C and the electric storage unit 11D store 11E as the uncharged ID history, but the electric storage unit 11C and the electric storage unit 11D are based on information of the electric storage unit having early identification number. Also, before the charging of the electric storage unit 11E is started, the short circuit of the electric storage unit (single electric storage unit) 11C is set to a conduction state. Specifically, the power input unit $C_1$ and the power output unit $C_6$ are set to a short-circuit state. Also, control is performed such that charging power is prevented from flowing in from the electric storage unit 11D to the electric storage unit 11E. Also, the electric storage unit 11E connected to the more downstream side than the electric storage unit (single electric storage unit) 11C and the electric storage unit 11D may be charged through the two electric storage units, that is, the electric storage unit (single electric storage unit) 11C and the electric storage unit 11D.

The entire electric storage units store 11A, 11B, 11C and 11D as the already-charged ID history, and the electric storage unit 11C selects an electric storage unit, based on the content 11E of the uncharged ID history, that is, the electric storage unit 11C selects the electric storage unit 11E. Then, the electric storage unit 11C starts the charging of the electric storage unit 11E. Also, the full charge of the electric storage unit 11C and the electric storage unit 11D is notified to the parent electric storage unit 11A.

In this state, the electric storage unit 11E corresponds to the single electric storage unit. Also, electric storage units having power input units 51 ($B_5$, $F_1$) connected to power output units 53 ($E_2$, $E_4$) of the electric storage unit 11E are the electric storage unit 11B and the electric storage unit 11F.

Since 11B is contained in the already-charged ID history stored in the electric storage unit 11E, the electric storage unit 11F corresponds to the electric storage unit connected to the more downstream side than the single electric storage unit, but the electric storage unit 11B is excluded from the electric storage unit connected to the more downstream side than the single storage unit.

As described above, the electric storage unit 11F corresponds to the electric storage unit connected to the more downstream side than the single electric storage unit. The electric storage unit 11E stores 11F as the uncharged ID history. Also, the outflow of charging power to the electric storage unit 11F connected to the downstream side of the electric storage unit (single electric storage unit) 11E is prohibited until the electric storage unit (single electric storage unit) 11E is fully charged. Specifically, the outflow of power from the power output unit $E_4$ is prohibited.

[Step-140]

When the electric storage unit (single electric storage unit) 11E is fully charged, the charging of the electric storage unit 11E is stopped. The electric storage unit 11F connected to the more downstream side than the electric storage unit (single electric storage unit) 11E is charged through the electric storage unit (single electric storage unit) 11E. Also, before the charging of the electric storage unit 11F is started, the short circuit of the electric storage unit 11E is set to a conduction state. Specifically, the power input unit $E_3$ and the power output unit $E_4$ are set to a short-circuit state.

The entire electric storage units store 11A, 11B, 11C, 11D and 11E as the already-charged ID history, and the electric storage unit 11E selects an electric storage unit, based on the content 11F of the uncharged ID history, that is, the electric storage unit 11E selects the electric storage unit 11F. Then, the electric storage unit 11E starts the charging of the electric storage unit 11F. Also, the full charge of the electric storage unit 11E is notified to the parent electric storage unit 11A.

In this state, an electric storage unit having a power input unit 51 connected to a power output unit 53 of the electric storage unit 11F is the electric storage unit 11C. Since 11C is contained in the already-charged ID history stored in the electric storage unit 11F, the electric storage unit 11C is excluded from the electric storage unit connected to the more downstream side than the single storage unit. Therefore, since there is no electric storage unit connected to the more downstream side than the single electric storage unit, the electric storage unit 11F stores NULL as the uncharged ID history. When the electric storage unit 11F is fully charged, the charging of the electric storage unit 11F is stopped.

[Step-150]

The electric storage unit 11A serving as the parent electric storage unit checks the already-discharged ID history and checks whether there is an electric storage unit, the charging of which is not yet completed. In the first embodiment, since the entire electric storage units finish charging, the charging process is completed. In this manner, the repetition of the charging process until the rechargeable battery cells constituting the entire electric storage units are fully charged has been completed.

Second Embodiment

A second embodiment is a modification of the first embodiment. In the first embodiment, the power input unit $A_1$ of the electric storage unit 11A is connected to the power supply 12. On the other hand, in the second embodiment, as illustrated in FIG. 1(B), the power input unit $D_1$ of the electric storage unit 11D is connected to the power supply 12. Hereinafter, a method for charging an electric storage unit group and a method for supplying and receiving power according to a second embodiment will be described. Also, in the second embodiment, the electric storage unit 11D is set as a parent electric storage unit, and the remaining five electric storage units 11A, 11B, 11C, 11E and 11F are set as child electric storage units.

[Step-200]

The electric storage unit 11D serving as the parent electric storage unit inquires of the five child electric storage units 11A, 11B, 11C, 11E and 11F about completion of charge start preparation. When the entire electric storage units 11A, 11B, 11C, 11D, 11E and 11F have completed the charge start preparation, the charging of the rechargeable battery cell 30 of the electric storage unit 11D is started.

In this state, the electric storage unit 11D corresponds to the single electric storage unit. Also, electric storage units having power input units 51 ($A_5$, $E_1$) connected to power output units 53 ($D_2$, $D_4$) of the electric storage unit 11D are the electric storage unit 11A and the electric storage unit 11E. Therefore, the electric storage unit 11A and the electric storage unit 11E correspond to the electric storage units connected to the more downstream side than the single electric storage unit. The electric storage unit 11D stores 11A and 11E as the uncharged ID history. Also, the outflow of charging power to the electric storage unit 11A and the electric storage unit 11E connected to the downstream side of the electric storage unit (single electric storage unit) 11D is prohibited until the electric storage unit (single electric storage unit) 11D is fully charged. Specifically, the outflow of power from the power output units $D_2$ and $D_4$ is prohibited.

[Step-210]

When the electric storage unit (single electric storage unit) 11D is fully charged, the charging of the electric storage unit 11D is stopped. The electric storage unit 11A and the electric storage unit 11E connected to the more downstream side than the electric storage unit (single electric storage unit) 11D are charged through the electric storage unit (single electric storage unit) 11D. Also, before the charging of the electric storage unit 11A and the electric storage unit 11E is started, the short circuit of the electric storage unit (single electric storage unit) 11D is set to a conduction state. Specifically, the power input unit $D_1$ and the power output unit $D_2$ are set to a short-circuit state, and the power input unit $D_1$ and the power output unit $D_4$ are set to a short-circuit state.

The entire electric storage units store 11D as the already-charged ID history, and the electric storage unit 11D selects an electric storage unit, based on the contents 11A and 11E of the uncharged ID history, that is, the electric storage unit 11D selects the electric storage unit 11A and the electric storage unit 11E. Then, the electric storage unit 11D starts the charging of the electric storage unit 11A and the electric storage unit 11E. Also, the full charge of the electric storage unit 11D is notified to the parent electric storage unit 11D.

In this state, the electric storage unit 11A corresponds to the single electric storage unit. An electric storage unit having a power input unit 51 ($B_1$) connected to a power output unit 53 ($A_4$) of the electric storage unit 11A is the electric storage unit 11B. Also, the electric storage unit 11E corresponds to the single electric storage unit. Electric storage units having power input units 51 ($B_5$, $F_1$) connected to power output units 53 ($E_2$, $E_4$) of the electric storage unit 11E are the electric storage unit 11B and the electric storage unit 11F. Therefore, the electric storage unit 11B and the electric storage unit 11F correspond to the electric storage units connected to the more downstream side than the single electric storage unit. The electric storage unit 11A stores 11B as the uncharged ID history. Also, the outflow of charging power to the electric storage unit 11B connected to the downstream side of the electric storage unit (single electric storage unit) 11A is prohibited until the electric storage unit (single electric storage unit) 11A is fully charged. Specifically, the outflow of power from the power output unit $A_4$ is prohibited. Likewise, the electric storage unit 11E stores 11B and 11F as the uncharged ID history. Also, the outflow of charging power to the electric storage unit 11F connected to the downstream side of the electric storage unit (single electric storage unit) 11E is prohibited until the electric storage unit (single electric storage unit) 11E is fully charged. Specifically, the outflow of power from the power output units $E_2$ and $E_4$ is prohibited.

[Step-220]

When the electric storage unit (single electric storage unit) 11A and the electric storage unit 11E are fully charged, the charging of the electric storage unit 11A and the electric storage unit 11E is stopped. The electric storage unit 11B connected to the more downstream side than the electric storage unit (single electric storage unit) 11A is charged through the electric storage unit (single electric storage unit) 11A. Also, the electric storage unit 11F connected to the more downstream side than the electric storage unit (single electric storage unit) 11E is charged through the electric storage unit (single electric storage unit) 11E. Also, before the charging of the electric storage unit 11B and the electric storage unit 11F is started, the short circuits of the electric storage unit (single electric storage unit) 11A and the electric storage unit 11E are set to a conduction state. Specifically, the power input unit $A_5$ and the power output unit $A_4$ are set to a short-circuit state, and the power input unit $E_1$ and the power output unit $E_4$ are set to a short-circuit state.

The entire electric storage units store 11D, 11A and 11E as the already-charged ID history, and the electric storage unit 11A selects an electric storage unit, based on the content 11B of the uncharged ID history, that is, the electric storage unit 11A selects the electric storage unit 11B. Then, the electric storage unit 11A starts the charging of the electric storage unit 11B. Also, the full charge of the electric storage unit 11A is notified to the parent electric storage unit 11D. On the other hand, the electric storage unit 11E selects the electric storage units, based on the contents 11B and 11F of the uncharged ID history. However, since the uncharged ID history 11B is already selected by the electric storage unit 11A, which is the electric storage unit having earlier identification number than the electric storage unit 11E, the electric storage unit 11E is prohibited from selecting the electric storage unit 11B. Therefore, the electric storage unit 11E selects the electric storage unit 11F, and starts the charging of the electric storage unit 11F. Also, the full charge of the electric storage unit 11E is notified to the parent electric storage unit 11D.

In this state, the electric storage unit 11B and the electric storage unit 11F correspond to the single electric storage unit. Also, electric storage units having power input units 51 ($C_1$, $D_3$) connected to power output units 53 ($B_4$, $B_6$) of the electric storage unit 11B are the electric storage unit 11C and the electric storage unit 11D. On the other hand, an electric storage unit having a power input unit 51 ($C_5$) connected to a power output unit 53 ($F_2$) of the electric storage unit 11F is the electric storage unit 11C.

Since 11D is contained in the already-charged ID history stored in the electric storage unit 11B, the electric storage unit 11C corresponds to the electric storage unit connected to the more downstream side than the single electric storage unit, but the electric storage unit 11D is excluded from the electric storage units connected to the more downstream side than the single storage unit. Therefore, the electric storage unit 11C corresponds to the electric storage unit connected to the more downstream side than the single electric storage unit.

The electric storage unit 11B stores 11C as the uncharged ID history. On the other hand, the electric storage unit 11F stores 11C as the uncharged ID history. Also, the outflow of charging power to the electric storage unit 11C connected to the downstream side of the electric storage unit (single electric storage unit) 11B is prohibited until the electric storage unit (single electric storage unit) 11B is fully charged. Specifically, the outflow of power from the power output unit $B_4$ is prohibited. Likewise, the outflow of charging power to the electric storage unit 11C connected to the downstream side of the electric storage unit (single electric storage unit) 11F is prohibited until the electric storage unit (single electric storage unit) 11F is fully charged. Specifically, the outflow of power from the power output unit $F_2$ is prohibited.

[Step-230]

When the electric storage unit (single electric storage unit) 11B and the electric storage unit 11F are fully charged, the charging of the electric storage unit 11B and the electric storage unit 11F is stopped. The electric storage unit 11B and the electric storage unit 11F store 11C as the uncharged ID history, but the electric storage unit 11B and the electric storage unit 11F are based on information of the electric storage unit having early identification number. Therefore, the electric storage unit 11C is charged through the electric storage unit 11B. Also, before the charging of the electric storage unit 11C is started, the short circuit of the electric storage unit (single electric storage unit) 11B is set to a conduction state. Specifically, the power input unit $B_1$ and the power output unit $B_4$ are set to a short-circuit state. Also, control is performed such that charging power is prevented from flowing in from the electric storage unit 11F to the electric storage unit 11C. Also, the electric storage unit 11C connected to the more downstream side than the electric storage unit (single electric storage unit) 11B and the electric storage unit 11F may be charged through the two electric storage units, that is, the electric storage unit (single electric storage unit) 11B and the electric storage unit 11F.

The entire electric storage units store 11D, 11A, 11E, 11B and 11F as the already-charged ID history, and the electric storage unit 11B selects an electric storage unit, based on the content 11C of the uncharged ID history, that is, the electric storage unit 11B selects the electric storage unit 11C. Then, the electric storage unit 11B starts the charging of the electric storage unit 11C. Also, the full charge of the electric storage unit 11B is notified to the parent electric storage unit 11D.

In this state, there is no electric storage unit having the power input unit 51 connected to the power output unit 53 of the electric storage unit 11C. The electric storage unit 11C stores NULL as the uncharged ID history. When the electric storage unit 11C is fully charged, the charging of the electric storage unit 11C is stopped.

[Step-240]

The electric storage unit 11D serving as the parent electric storage unit checks the already-discharged ID history and checks whether there is an electric storage unit, the charging of which is not yet completed. In the second embodiment, since the entire electric storage units finish charging, the charging process is completed. In this manner, the repetition of the charging process until the rechargeable battery cells constituting the entire electric storage units are fully charged has been completed.

Third Embodiment

Figure 4:
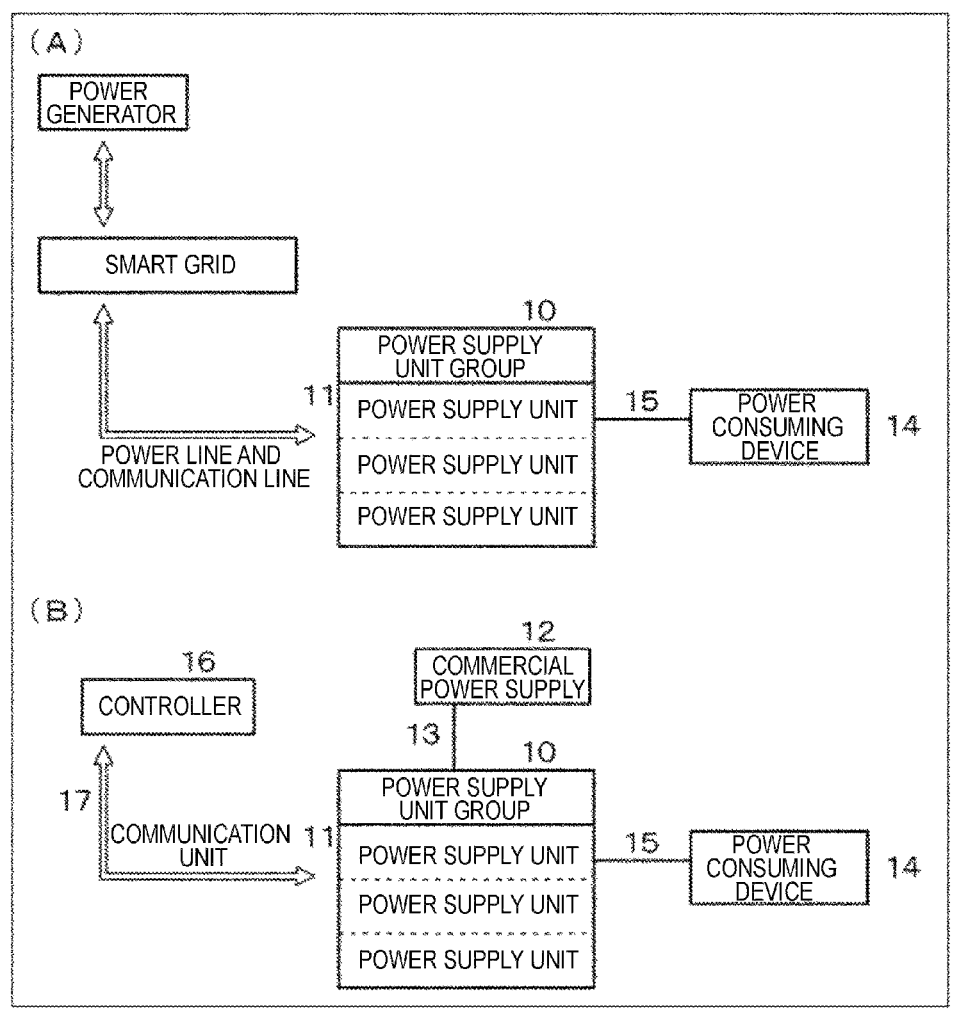
FIGS. 4(A) and 4(B) are a conceptual diagram of a power distribution grid or the like in method for supplying and receiving power according to a first embodiment and a fourth embodiment, and a conceptual diagram of an electric storage unit group according to a third embodiment and a sixth embodiment, respectively.

A third embodiment also is a modification of the first embodiment. In the third embodiment, an electric storage unit group 10 is connected to a controller 16 through a communication unit 17. The charging of the electric storage unit group 10 is performed under the control of the controller 16. FIG. 4(B) illustrates a conceptual diagram of the electric storage unit group of the third embodiment.

For example, the controller 16 configured by a personal computer is connected to an information output unit of an electric storage unit 11 by a USB cable, and the controller 16 can control a plurality of electric storage units 11, transmit/receive or exchange information among the plurality of electric storage units 11, check operating conditions of the plurality of electric storage units 11, and display the operating conditions of the plurality of electric storage units 11. Also, the controller 16 and the respective electric storage units 11 may be connected to one another through, for example, ZigBee.

Under the control of the controller 16 and the charging/discharging control unit 40, each of the electric storage units 11 performs charging or discharging related processing, performs control of the short circuit, measures a remaining battery level, and evaluates the remaining battery level in n steps. Furthermore, each of the electric storage units 11 transmits/receives identification number (ID), information about remaining battery level, already-charged ID history, uncharged ID history, completion of charge start preparation, and the like, to/from the controller 16.

Hereinafter, the method for charging the electric storage unit group and the method for supplying and receiving power according to the third embodiment will be described.

[Step-300]

The controller 16 inquires of the electric storage units 11A, 11B, 11C, 11D, 11E and 11F about completion of charge start preparation. When the entire electric storage units 11A, 11B, 11C, 11D, 11E and 11F have completed the charge start preparation, the charging of the rechargeable battery cell 30 of the electric storage unit 11A is started.

In this state, the electric storage unit 11A corresponds to the single electric storage unit. Also, an electric storage unit having a power input unit 51 ($B_1$) connected to a power output unit 53 ($A_4$) of the electric storage unit 11A is only the electric storage unit 11B. Therefore, the electric storage unit 11B corresponds to the electric storage unit connected to the more downstream side than the single electric storage unit. The controller 16 stores 11B as the uncharged ID history. Also, the outflow of charging power to the electric storage unit 11B connected to the downstream side of the electric storage unit (single electric storage unit) 11A is prohibited until the electric storage unit (single electric storage unit) 11A is fully charged. Specifically, the outflow of power from the power output unit $A_4$ is prohibited.

[Step-310]

When the electric storage unit (single electric storage unit) 11A is fully charged, the charging of the electric storage unit 11A is stopped under the control of the controller 16. The electric storage unit 11B connected to the more downstream side than the electric storage unit (single electric storage unit) 11A is charged through the electric storage unit (single electric storage unit) 11A. Also, before the charging of the electric storage unit 11B is started, the short circuit of the electric storage unit (single electric storage unit) 11A is set to a conduction state. Specifically, the power input unit $A_1$ and the power output unit $A_4$ are set to a short-circuit state.

The controller 16 stores 11A as the already-charged ID history, selects an electric storage unit, based on the content 11B of the uncharged ID history, that is, selects the electric storage unit 11B, and starts the charging of the electric storage unit 11B.

In this state, the electric storage unit 11B corresponds to the single electric storage unit. Also, electric storage units having power input units 51 ($C_1$, $D_3$) connected to power output units 53 ($B_4$, $B_6$) of the electric storage unit 11B are the electric storage unit 11C and the electric storage unit 11D. Therefore, the electric storage unit 11C and the electric storage unit 11D correspond to the electric storage unit connected to the more downstream side than the single electric storage unit. The controller 16 stores 11C and 11D as the uncharged ID history. Also, the outflow of charging power to the electric storage unit 11C and the electric storage unit 11D connected to the downstream side of the electric storage unit (single electric storage unit) 11B is prohibited until the electric storage unit (single electric storage unit) 11B is fully charged. Specifically, the outflow of power from the power output units $B_4$ and $B_6$ is prohibited.

[Step-320]

When the electric storage unit (single electric storage unit) 11B is fully charged, the controller 16 stops the charging of the electric storage unit 11B. The electric storage unit 11C and the electric storage unit 11D connected to the more downstream side than the electric storage unit (single electric storage unit) 11B are charged through the electric storage unit (single electric storage unit) 11B. Also, before the charging of the electric storage unit 11C and the electric storage unit 11D is started, the short circuit of the electric storage unit (single electric storage unit) 11B is set to a conduction state. Specifically, the power input unit $B_1$ and the power output unit $B_4$ are set to a short-circuit state, and the power input unit $B_1$ and the power output unit $B_6$ are set to a short-circuit state.

The controller 16 stores 11A and 11B as the already-charged ID history, and selects an electric storage unit, based on the contents 11C and 11D of the uncharged ID history (that is, the controller 16 selects the electric storage unit 11C and the electric storage unit 11D).

In this state, the electric storage unit 11C and the electric storage unit 11D correspond to the single electric storage unit. Also, an electric storage unit having a power input unit 51 ($E_3$) connected to a power output unit 53 ($C_6$) of the electric storage unit 11C is the electric storage unit 11E. On the other hand, electric storage units having power input units 51 ($A_5$, $E_1$) connected to power output units 53 ($D_2$, $D_4$) of the electric storage unit 11D are the electric storage unit 11A and the electric storage unit 11E.

Since 11A is contained in the already-charged ID history stored in the electric storage unit 11D, the electric storage unit 11E corresponds to the electric storage unit connected to the more downstream side than the single electric storage unit, but the electric storage unit 11A is excluded from the electric storage units connected to the more downstream side than the single storage unit. That is, the electric storage unit, the charging of which has already been completed, is excluded from the electric storage units connected to the more downstream side than the single electric storage unit.

As described above, the electric storage unit 11E corresponds to the electric storage unit connected to the more downstream side than the single electric storage unit. The controller 16 stores 11E as the uncharged ID history. Also, the outflow of charging power to the electric storage unit 11E connected to the downstream side of the electric storage unit (single electric storage unit) 11C is prohibited until the electric storage unit (single electric storage unit) 11C is fully charged. Specifically, the outflow of power from the power output unit $C_6$ is prohibited. Likewise, the outflow of charging power to the electric storage unit 11E connected to the downstream side of the electric storage unit (single electric storage unit) 11D is prohibited until the electric storage unit (single electric storage unit) 11D is fully charged. Specifically, the outflow of power from the power output unit $D_4$ is prohibited.

[Step-330]

When the electric storage unit (single electric storage unit) 11C and the electric storage unit 11D are fully charged, the charging of the electric storage unit 11C and the electric storage unit 11D is stopped under the control of the controller 16. The electric storage unit 11E connected to the more downstream side than the electric storage unit (single electric storage unit) 11C is charged through the electric storage unit (single electric storage unit) 11C. The controller 16 stores 11E as the uncharged ID history, but the controller 16 is based on information of the electric storage unit having early identification number. Specifically, the power input unit $C_1$ and the power output unit $C_6$ are set to a short-circuit state. Also, control is performed such that charging power is prevented from flowing in from the electric storage unit 11D to the electric storage unit 11E. Also, the electric storage unit 11E connected to the more downstream side than the electric storage unit (single electric storage unit) 11C and the electric storage unit 11D may be charged through the two electric storage units, that is, the electric storage unit (single electric storage unit) 11C and the electric storage unit 11D.

The controller 16 stores 11A, 11B, 11C and 11D as the already-charged ID history, selects an electric storage unit, based on the content 11E of the uncharged ID history, that is, selects the electric storage unit 11E, and starts the charging of the electric storage unit 11E.

In this state, the electric storage unit 11E corresponds to the single electric storage unit. Also, electric storage units having power input units 51 ($B_5$, $F_1$) connected to power output units 53 ($E_2$, $E_4$) of the electric storage unit 11E are the electric storage unit 11B and the electric storage unit 11F.

Since 11B is contained in the already-charged ID history stored in the electric storage unit 11E, the electric storage unit 11F corresponds to the electric storage unit connected to the more downstream side than the single electric storage unit, but the electric storage unit 11B is excluded from the electric storage units connected to the more downstream side than the single storage unit.

As described above, the electric storage unit 11F corresponds to the electric storage unit connected to the more downstream side than the single electric storage unit. The controller 16 stores 11F as the uncharged ID history. Also, the outflow of charging power to the electric storage unit 11F connected to the downstream side of the electric storage unit (single electric storage unit) 11E is prohibited until the electric storage unit (single electric storage unit) 11E is fully charged. Specifically, the outflow of power from the power output unit $E_4$ is prohibited.

[Step-340]

When the electric storage unit (single electric storage unit) 11E is fully charged, the charging of the electric storage unit 11E is stopped under the control of the controller 16. The electric storage unit 11F connected to the more downstream side than the electric storage unit (single electric storage unit) 11E is charged through the electric storage unit (single electric storage unit) 11E. Also, before the charging of the electric storage unit 11F is started, the short circuit of the electric storage unit (single electric storage unit) 11E is set to a conduction state. Specifically, the power input unit $E_3$ and the power output unit $E_4$ are set to a short-circuit state.

The controller 16 stores 11A, 11B, 11C, 11D and 11E as the already-charged ID history, selects an electric storage unit, based on the content 11F of the uncharged ID history, and starts the charging of the electric storage unit 11F.

In this state, an electric storage unit having a power input unit 51 connected to a power output unit 53 of the electric storage unit 11F is the electric storage unit 11C. Since 11C is contained in the already-charged ID history, the electric storage unit 11C is excluded from the electric storage units connected to the more downstream side than the single storage unit. Therefore, since there is no electric storage unit connected to the more downstream side than the single electric storage unit, the electric storage unit 11F stores NULL as the uncharged ID history. When the electric storage unit 11F is fully charged, the charging of the electric storage unit 11F is stopped.

[Step-350]

The controller 16 checks the already-discharged ID history and checks whether there is an electric storage unit, the charging of which is not yet completed. In the third embodiment, since the entire electric storage units finish charging, the charging process is completed. In this manner, the repetition of the charging process until the rechargeable battery cells constituting the entire electric storage units are fully charged has been completed.

Fourth Embodiment

Figure 5:
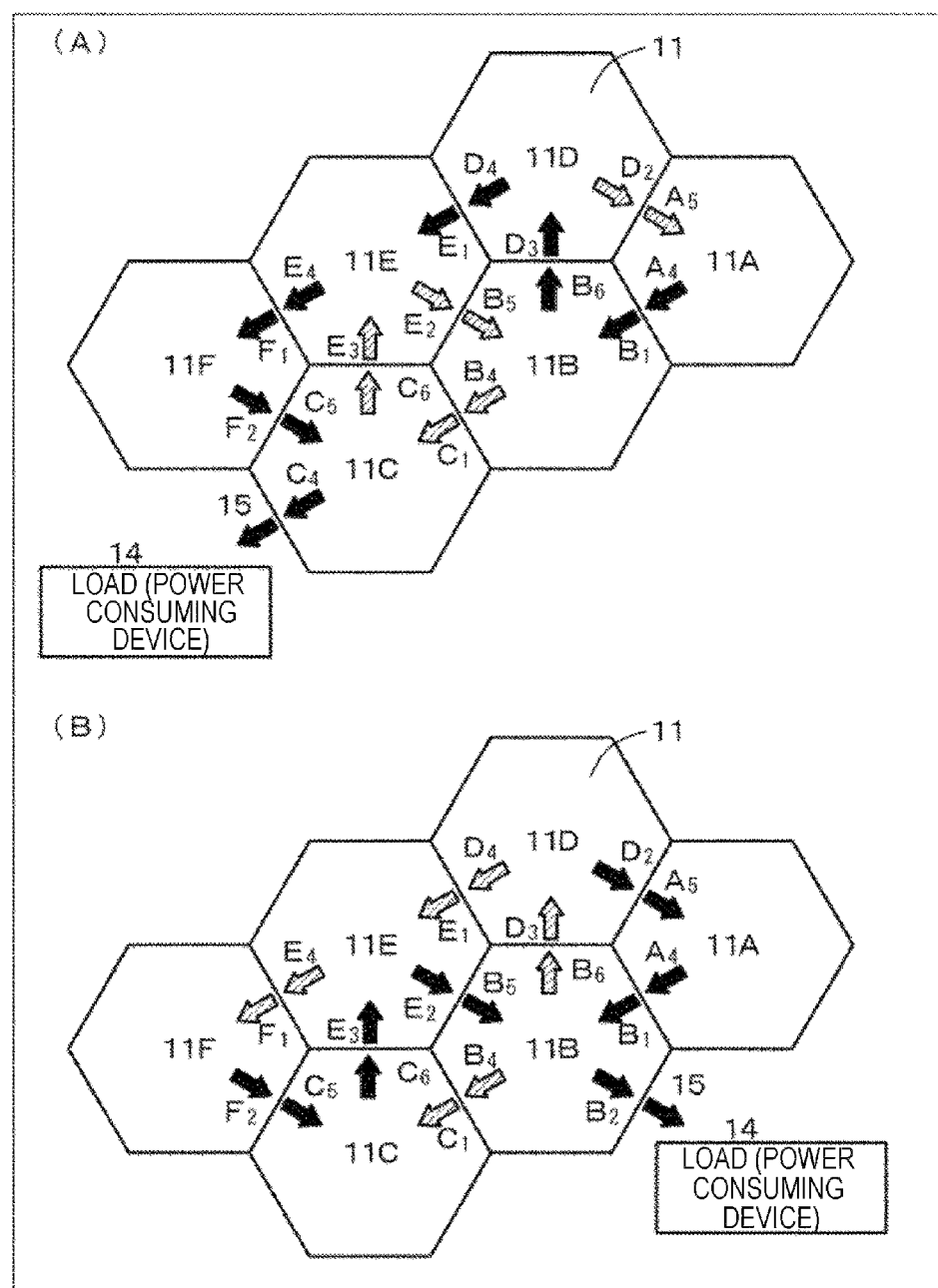
FIGS. 5(A) and 5(B) are diagrams illustrating power routes in method for discharging an electric storage unit group according to a fourth embodiment and a fifth embodiment, respectively.

A fourth embodiment relates to an electric storage unit group, a charger, and an electronic device according to the second aspect of the present disclosure, and a method for discharging the electric storage unit group of the present disclosure and a method for supplying and receiving power according to the second aspect of the present disclosure. FIG. 5(A) is schematic diagram viewed from above an electric storage unit group configured by a combination of six electric storage units in the present disclosure.

The electric storage unit group of the fourth embodiment is an electric storage unit group 10 in which a plurality of electric storage units 11 having rechargeable battery cells 30 are linearly or reticulately connected. At a downstream side of the electric storage unit group 10, the electric storage unit group 10 is connected to a load. When a voltage of a rechargeable battery cell 30 constituting a single electric storage unit 11 becomes equal to or lower than a predetermined voltage, the discharging from the single electric storage unit 11 is stopped, and the discharging of an electric storage unit 11 connected to an upstream side of the single electric storage unit 11 is started.

Also, the charger of the fourth embodiment is a charger configured by an electric storage unit group 10 in which a plurality of electric storage units 11 having rechargeable battery cells 30 are linearly or reticulately connected. At a downstream side of the electric storage unit group 10, the electric storage unit group 10 is connected to a load. When a voltage of a rechargeable battery cell 30 constituting a single electric storage unit 11 becomes equal to or lower than a predetermined voltage, the discharging from the single electric storage unit 11 is stopped, and the discharging of an electric storage unit 11 connected to an upstream side of the single electric storage unit 11 is started.

Also, the electronic device of the fourth embodiment is an electronic device including: an electric storage unit group 10 in which a plurality of electric storage units 11 having rechargeable battery cells 30 are linearly or reticulately connected; and an electronic component that receives power from the electric storage unit group 10. At a downstream side of the electric storage unit group 10, the electric storage unit group 10 is connected to the electronic component. When a voltage of a rechargeable battery cell 30 constituting a single electric storage unit 11 becomes equal to or lower than a predetermined voltage, the discharging from the single electric storage unit 11 is stopped, and the discharging of an electric storage unit 11 connected to an upstream side of the single electric storage unit 11 is started.

In the electric storage unit group 10, the charger, or the electronic device according to the fourth embodiment, the electric storage unit group 10 is connected to the load at the downstream side of the electric storage unit group. Specifically, in the fourth embodiment, for example, the electric storage unit 11C is connected to the load. The load is a power consuming device 14. The electric storage unit group 10 and the load (power consuming device) may be connected by using a wire 15, or may be connected by employing a wireless power transmission method (wireless power transmission circuit), such as an electromagnetic induction method or a magnetic resonance method. The electric storage unit 11C is set as a parent electric storage unit, and the remaining five electric storage units 11A, 11B, 11D, 11E and 11F are set as child electric storage units.

Hereinafter, a method for discharging an electric storage unit group according to a fourth embodiment and a method for supplying and receiving power according to a fourth embodiment will be described. However, as illustrated in a conceptual diagram of FIG. 4(A), the method for supplying and receiving power according to the fourth embodiment is a method for supplying and receiving power, which supplies power from an electric storage unit group in which a plurality of electric storage units having rechargeable battery cells are linearly or reticulately connected, and receives power from a power generator and a power distribution grid (including a smart grid and a next-generation power distribution grid). At an upstream side of the electric storage unit group, the electric storage unit group 10 is connected to the power generator for charging the electric storage units through the power distribution grid. At a downstream side of the electric storage unit group, the electric storage unit group 10 is connected to the load (for example, power consuming device) 14. The method for supplying and receiving power includes a charging process of: when a rechargeable battery cell constituting a single electric storage unit is fully charged, stopping the charging of the single electric storage unit; and charging an electric storage unit, connected to a more downstream side than the single electric storage unit, through the single electric storage unit.

[Step-400]

When connected to the load, the electric storage unit 11C serving as the parent electric storage unit inquires of the five child electric storage units 11A, 11B, 11D, 11E and 11F about completion of discharge start preparation. When the entire electric storage units 11A, 11B, 11C, 11D, 11E and 11F have completed the discharge start preparation, the discharging of the rechargeable battery cell 30 of the electric storage unit 11C is started.

In this state, the electric storage unit 11C corresponds to the single electric storage unit. Also, electric storage units having power output units 53 ($B_4$, $F_2$) connected to power input units 51 ($C_1$, $C_5$) of the electric storage unit 11C are the electric storage unit 11B and the electric storage unit 11F. Therefore, the electric storage unit 11B and the electric storage unit 11F correspond to the electric storage units connected to the more upstream side than the single electric storage unit. Also, during the discharging of the electric storage unit (single electric storage unit) 11C, the discharging from the electric storage unit 11B and the electric storage unit 11F connected to the upstream side of the electric storage unit (single electric storage unit) 11C is prohibited. Specifically, the inflow of power from the power input units $C_1$ and $C_5$ is prohibited.

The electric storage unit 11C measures the remaining battery level of the electric storage unit 11C periodically (for example, every 1 second). Also, the electric storage unit 11C inquires of the electric storage unit 11B and the electric storage unit 11F about the remaining battery levels periodically (for example, every 10 seconds). The electric storage unit 11B and the electric storage unit 11F measure the remaining battery levels, and report the measured remaining battery levels to the electric storage unit 11C in the expression of n steps. Also, such an operation is equally performed in each of the following steps. That is, the electric storage unit periodically inquires about the remaining battery level to an adjacent electric storage unit having a power input unit connected to a power output unit of the electric storage unit. The electric storage unit receiving the inquiry evaluates the remaining battery level in n steps, and notifies the evaluated remaining battery level, together with identification number, to the electric storage unit having sent the inquiry. The same is applied to the following embodiment.

The electric storage unit 11C stores the identification number of the electric storage unit having a higher remaining battery level among these remaining battery levels, for example, the identification number 11F of the electric storage unit 11F, as the undischarged ID history. Also, the identification number 11B of the electric storage unit 11B is stored as the undischarged pending ID history. In the fourth embodiment, the remaining battery level of the electric storage unit 11F also is stored. Also, when the remaining battery levels are equal to each other, the remaining battery level of the electric storage unit having the earlier identification number is stored.

[Step-410]

When a voltage of the rechargeable battery cell constituting the electric storage unit (single electric storage) 11C (hereinafter, for convenience, referred to as a voltage of the electric storage unit) becomes equal to or lower than a predetermined voltage, the discharging of the electric storage unit (single electric storage unit) 11C is stopped.

The entire electric storage units store 11C as the already-discharged ID history, and the electric storage unit 11C selects an electric storage unit, based on the content 11F of the undischarged ID history, that is, the electric storage unit 11C selects the electric storage unit 11F. Then, the electric storage unit 11C notifies the electric storage unit 11F that the voltage of the electric storage unit 11C becomes equal to or lower than the predetermined voltage. Also, before the discharging of the electric storage unit 11F is started, the short circuit of the electric storage unit 11C is set to a conduction state. Specifically, the power input unit $C_5$ and the power output unit $C_4$ are set to a short-circuit state.

In this state, the electric storage unit 11F corresponds to the single electric storage unit. Also, an electric storage unit having a power output unit 53 ($E_4$) connected to a power input unit 51 ($F_1$) of the electric storage unit 11F is the electric storage unit 11E. Therefore, the electric storage unit 11E corresponds to the electric storage unit connected to the more upstream side than the single electric storage unit. The electric storage unit 11F stores 11E as the undischarged ID history. Also, the discharging from the electric storage unit 11E connected to the upstream side of the electric storage unit (single electric storage unit) 11F is prohibited until the voltage of the electric storage unit (single electric storage unit) 11F becomes equal to or lower than the predetermined voltage. Specifically, the inflow of power from the power output unit $F_1$ is prohibited.

The discharging of the electric storage unit 11F connected to the upstream side of the electric storage unit (single electric storage unit) 11C is started.

[Step-420]

When the voltage of the electric storage unit (single electric storage unit) 11F becomes equal to or lower than the predetermined voltage, the electric storage unit 11F stops discharging.

The entire electric storage units store 11C and 11F as the already-discharged ID history, and the electric storage unit 11F selects an electric storage unit, based on the content 11E of the undischarged ID history, that is, the electric storage unit 11F selects the electric storage unit 11E. Then, the electric storage unit 11F notifies the electric storage unit 11E that the voltage of the electric storage unit 11E becomes equal to or lower than the predetermined voltage. Also, before the discharging of the electric storage unit connected to the upstream side is started, the short circuit of the electric storage unit 11F is set to a conduction state. Specifically, the power input unit $F_1$ and the power output unit $F_2$ are set to a short-circuit state.

In this state, the electric storage unit 11E corresponds to the single electric storage unit. Also, electric storage units having power output units 53 ($D_4$, $C_6$) connected to power input units 51 ($E_1$, $E_3$) of the electric storage unit 11E are the electric storage unit 11D and the electric storage unit 11C. Since 11C is contained in the already-discharged ID history stored in the electric storage unit 11E, the electric storage unit 11D corresponds to the electric storage unit connected to the more upstream side than the single electric storage unit, but the electric storage unit 11C is excluded from the electric storage units connected to the more upstream side than the single storage unit. That is, the electric storage unit, the discharging of which has already been completed, is excluded from the electric storage units connected to the more upstream side than the single electric storage unit. The same is applied to the following description. Also, in this manner, it is possible to prevent occurrence of discharging loop in the discharge route. As described above, the electric storage unit 11D corresponds to the electric storage unit connected to the more upstream side than the single electric storage unit. The electric storage unit 11E stores 11D as the undischarged ID history. Also, the discharging from the electric storage unit 11D connected to the upstream side of the electric storage unit (single electric storage unit) 11E is prohibited until the voltage of the electric storage unit (single electric storage unit) 11E becomes equal to or lower than the predetermined voltage. Specifically, the inflow of power from the power input unit $E_1$ is prohibited.

The discharging of the electric storage unit 11E connected to the more upstream side than the electric storage unit (single electric storage unit) 11F is started through the electric storage unit (single electric storage unit) 11F.

[Step-430]

When the voltage of the electric storage unit (single electric storage unit) 11E becomes equal to or lower than the predetermined voltage, the electric storage unit 11E stops discharging.

The entire electric storage units store 11C, 11F and 11E as the already-discharged ID history, and the electric storage unit 11E selects an electric storage unit, based on the content 11D of the undischarged ID history, that is, the electric storage unit 11E selects the electric storage unit 11D. Then, the electric storage unit 11E notifies the electric storage unit 11D that the voltage of the electric storage unit 11E becomes equal to or lower than the predetermined voltage. Also, before the discharging of the electric storage unit connected to the upstream side is started, the short circuit of the electric storage unit 11E is set to a conduction state. Specifically, the power input unit $E_1$ and the power output unit $E_4$ are set to a short-circuit state.

In this state, the electric storage unit 11D corresponds to the single electric storage unit. Also, an electric storage unit having a power output unit 53 ($B_6$) connected to a power input unit 51 ($D_3$) of the electric storage unit 11D is the electric storage unit 11B. Therefore, the electric storage unit 11B corresponds to the electric storage unit connected to the more upstream side than the single electric storage unit. The electric storage unit 11D stores 11B as the undischarged ID history. Also, the discharging from the electric storage unit 11B connected to the upstream side of the electric storage unit (single electric storage unit) 11D is prohibited until the voltage of the electric storage unit (single electric storage unit) 11D becomes equal to or lower than the predetermined voltage. Specifically, the inflow of power from the power input unit $D_3$ is prohibited.

The discharging of the electric storage unit 11D connected to the more upstream side than the electric storage unit (single electric storage unit) 11E is started through the electric storage unit (single electric storage unit) 11E.

[Step-440]

When the voltage of the electric storage unit (single electric storage unit) 11D becomes equal to or lower than the predetermined voltage, the electric storage unit 11D stops discharging.

The entire electric storage units store 11C, 11F, 11E and 11D as the already-discharged ID history, and the electric storage unit 11D selects an electric storage unit, based on the content 11B of the undischarged ID history, that is, the electric storage unit 11D selects the electric storage unit 11B. Then, the electric storage unit 11D notifies the electric storage unit 11B that the voltage of the electric storage unit 11D becomes equal to or lower than the predetermined voltage. Also, before the discharging of the electric storage unit connected to the upstream side is started, the short circuit of the electric storage unit 11D is set to a conduction state. Specifically, the power input unit $D_3$ and the power output unit $D_4$ are set to a short-circuit state.

In this state, the electric storage unit 11B corresponds to the single electric storage unit. Also, electric storage units having power output units 53 ($A_4$, $E_2$) connected to power input units 51 ($B_1$, $B_5$) of the electric storage unit 11B are the electric storage unit 11A and the electric storage unit 11E. Since 11E is contained in the already-discharged ID history stored in the electric storage unit 11B, the electric storage unit 11A corresponds to the electric storage unit connected to the more upstream side than the single electric storage unit, but the electric storage unit 11E is excluded from the electric storage units connected to the more downstream side than the single storage unit. As described above, the electric storage unit 11A corresponds to the electric storage unit connected to the more upstream side than the single electric storage unit. The electric storage unit 11B stores 11A as the undischarged ID history. Also, the discharging from the electric storage unit 11A connected to the upstream side of the electric storage unit (single electric storage unit) 11B is prohibited until the voltage of the electric storage unit (single electric storage unit) 11B becomes equal to or lower than the predetermined voltage. Specifically, the inflow of power from the power input unit $B_1$ is prohibited.

The discharging of the electric storage unit 11B connected to the more upstream side than the electric storage unit (single electric storage unit) 11D is started through the electric storage unit (single electric storage unit) 11D.

[Step-450]

When the voltage of the electric storage unit (single electric storage unit) 11B becomes equal to or lower than the predetermined voltage, the electric storage unit 11B stops discharging.

The entire electric storage units store 11C, 11F, 11E, 11D and 11B as the already-discharged ID history, and the electric storage unit 11B selects an electric storage unit, based on the content 11A of the undischarged ID history, that is, the electric storage unit 11B selects the electric storage unit 11A. Then, the electric storage unit 11B notifies the electric storage unit 11A that the voltage of the electric storage unit 11B becomes equal to or lower than the predetermined voltage. Also, before the discharging of the electric storage unit connected to the upstream side is started, the short circuit of the electric storage unit 11B is set to a conduction state. Specifically, the power input unit $B_1$ and the power output unit $B_6$ are set to a short-circuit state.

In this state, an electric storage unit having a power output unit 53 connected to a power input unit 51 of the electric storage unit 11A is the electric storage unit 11D. Since 11D is contained in the already-discharged ID history, the electric storage unit 11D is excluded from the electric storage units connected to the more upstream side than the single storage unit. Therefore, since there is no electric storage unit connected to the more upstream side than the single electric storage unit, the electric storage unit 11A stores NULL as the uncharged ID history.

The discharging of the electric storage unit 11A connected to the more upstream side than the electric storage unit (single electric storage unit) 11B is started through the electric storage unit (single electric storage unit) 11B.

[Step-460]

When the voltage of the electric storage unit (single electric storage unit) 11A becomes equal to or lower than the predetermined voltage, the electric storage unit 11A stops discharging. Since the undischarged ID history is NULL, the parent electric storage unit 11C checks the already-discharged ID history and checks whether there is an electric storage unit that does not yet perform discharging. In the fourth embodiment, since the entire electric storage units finish discharging, the discharging process is completed. In this manner, the repetition of the discharging process in the rechargeable battery cells constituting the entire electric storage units has been completed.

Fifth Embodiment

A fifth embodiment is a modification of the fourth embodiment. In the fourth embodiment, the power output unit $C_4$ of the electric storage unit 11C is connected to the load 14. On the other hand, in the fifth embodiment, as illustrated in FIG. 5(B), the power output unit $B_2$ of the electric storage unit 11B is connected to the load 14. Hereinafter, the method for charging the electric storage unit group and the method for supplying and receiving power according to the fifth embodiment will be described. Also, in the fifth embodiment, the electric storage unit 11B is set as a parent electric storage unit, and the remaining five electric storage units 11A, 11C, 11D, 11E and 11F are set as child electric storage units.

[Step-500]

When connected to the load, the electric storage unit 11B serving as the parent electric storage unit inquires of the five child electric storage units 11A, 11C, 11D, 11E and 11F about completion of discharge start preparation. When the entire electric storage units 11A, 11B, 11C, 11D, 11E and 11F have completed the discharge start preparation, the discharging of the rechargeable battery cell 30 of the electric storage unit 11B is started.

In this state, the electric storage unit 11B corresponds to the single electric storage unit. Also, electric storage units having power output units 53 ($A_4$, $E_2$) connected to power input units 51 ($B_1$, $B_5$) of the electric storage unit 11B are the electric storage unit 11A and the electric storage unit 11E. Therefore, the electric storage unit 11A and the electric storage unit 11E correspond to the electric storage units connected to the more upstream side than the single electric storage unit. Also, during the discharging of the electric storage unit (single electric storage unit) 11B, the discharging from the electric storage unit 11A and the electric storage unit 11E connected to the upstream side of the electric storage unit (single electric storage unit) 11B is prohibited. Specifically, the inflow of power from the power input units $B_1$ and $B_5$ is prohibited.

It is assumed that the electric storage unit 11A and the electric storage unit 11E have the same remaining battery level. Therefore, the electric storage unit having early identification number, that is, the electric storage unit 11A, corresponds to the electric storage unit connected to the more upstream side than the single electric storage unit. The electric storage unit 11B stores 11A as the undischarged ID history. Also, the electric storage unit 11B stores 11E as the undischarged pending ID history.

[Step-510]

When a voltage of the electric storage unit (single electric storage unit) 11B becomes equal to or lower than a predetermined voltage, the electric storage unit (single electric storage unit) 11B stops discharging.

The entire electric storage units store 11B as the already-discharged ID history, and the electric storage unit 11B selects an electric storage unit, based on the content 11A of the undischarged ID history, that is, the electric storage unit 11B selects the electric storage unit 11A. Then, the electric storage unit 11B notifies the electric storage unit 11A that the voltage of the electric storage unit 11B becomes equal to or lower than the predetermined voltage. Also, before the discharging of the electric storage unit 11A is started, the short circuit of the electric storage unit 11B is set to a conduction state. Specifically, the power input unit $B_1$ and the power output unit $B_2$ are set to a short-circuit state.

In this state, the electric storage unit 11A corresponds to the single electric storage unit. Also, an electric storage unit having a power output unit 53 ($D_2$) connected to a power input unit 51 ($A_5$) of the electric storage unit 11A is the electric storage unit 11D. Therefore, the electric storage unit 11D corresponds to the electric storage unit connected to the more upstream side than the single electric storage unit. The electric storage unit 11A stores 11D as the undischarged ID history. Also, the discharging from the electric storage unit 11D connected to the upstream side of the electric storage unit (single electric storage unit) 11A is prohibited until the voltage of the electric storage unit (single electric storage unit) 11A becomes equal to or lower than the predetermined voltage. Specifically, the inflow of power from the power output unit $A_5$ is prohibited.

The discharging of the electric storage unit 11A connected to the upstream side of the electric storage unit (single electric storage unit) 11B is started.

[Step-520]

When the voltage of the electric storage unit (single electric storage unit) 11A becomes equal to or lower than the predetermined voltage, the electric storage unit 11A stops discharging.

The entire electric storage units store 11B and 11A as the already-discharged ID history, and the electric storage unit 11A selects an electric storage unit, based on the content 11D of the undischarged ID history, that is, the electric storage unit 11A selects the electric storage unit 11D. Then, the electric storage unit 11A notifies the electric storage unit 11D that the voltage of the electric storage unit 11A becomes equal to or lower than the predetermined voltage. Also, before the discharging of the electric storage unit connected to the upstream side is started, the short circuit of the electric storage unit 11A is set to a conduction state. Specifically, the power input unit $A_5$ and the power output unit $A_4$ are set to a short-circuit state.

In this state, the electric storage unit 11D corresponds to the single electric storage unit. Also, an electric storage unit having a power output unit 53 ($B_6$) connected to a power input unit 51 ($D_3$) of the electric storage unit 11D is the electric storage unit 11B. Since 11B is contained in the already-discharged ID history stored in the electric storage unit 11D, the electric storage unit 11B is excluded from the electric storage units connected to the more upstream side than the single storage unit. That is, the electric storage unit, the discharging of which has already been completed, is excluded from the electric storage units connected to the more upstream side than the single electric storage unit. Therefore, there are no electric storage units connected to the more upstream side than the single electric storage unit. The electric storage unit 11D stores NULL as the undischarged ID history.

The discharging of the electric storage unit 11D connected to the more upstream side than the electric storage unit (single electric storage unit) 11A is started through the electric storage unit (single electric storage unit) 11A.

[Step-530]

When the voltage of the electric storage unit (single electric storage unit) 11D becomes equal to or lower than the predetermined voltage, the electric storage unit 11D stops discharging.

The entire electric storage units store 11B, 11A and 11D as the already-discharged ID history. The content of the undischarged ID history in the electric storage unit 11D is NULL. Therefore, the electric storage unit 11B checks the already-discharged ID histories 11B, 11A and 11D and checks whether there is an electric storage unit that does not yet perform discharging. In the fifth embodiment, there are the electric storage units (the electric storage unit 11C, the electric storage unit 11E, and the electric storage unit 11F) that are not yet discharged. Therefore, the undischarged pending ID history is searched. The undischarged pending ID history is left in the electric storage unit 11B and is 11E.

Therefore, the electric storage unit 11B selects an electric storage unit, based on the content 11E of the undischarged pending ID history, that is, the electric storage unit 11B selects the electric storage unit 11E. Then, the electric storage unit 11B notifies the electric storage unit 11E that the voltage of the electric storage unit 11B becomes equal to or lower than the predetermined voltage. Also, before the discharging of the electric storage unit connected to the upstream side is started, the short circuit of the electric storage unit 11B is set to a conduction state. Specifically, the power input unit $B_5$ and the power output unit $B_2$ are set to a short-circuit state.

In this state, the electric storage unit 11E corresponds to the single electric storage unit. Also, electric storage units having power output units 53 ($D_4$, $C_6$) connected to power input units 51 ($E_1$, $E_3$) of the electric storage unit 11E are the electric storage unit 11D and the electric storage unit 11C. Since 11D is contained in the already-discharged ID history stored in the electric storage unit 11E, the electric storage unit 11C corresponds to the electric storage unit connected to the more upstream side than the single electric storage unit, but the electric storage unit 11D is excluded from the electric storage units connected to the more upstream side than the single storage unit. As described above, the electric storage unit 11C corresponds to the electric storage unit connected to the more upstream side than the single electric storage unit. The electric storage unit 11E stores 11C as the undischarged ID history. Also, the discharging from the electric storage unit 11C connected to the upstream side of the electric storage unit (single electric storage unit) 11E is prohibited until the voltage of the electric storage unit (single electric storage unit) 11E becomes equal to or lower than the predetermined voltage. Specifically, the inflow of power from the power input unit $E_3$ is prohibited.

The discharging of the electric storage unit 11E connected to the more upstream side than the electric storage unit (single electric storage unit) 11B is started through the electric storage unit (single electric storage unit) 11B.

[Step-540]

When the voltage of the electric storage unit (single electric storage unit) 11E becomes equal to or lower than the predetermined voltage, the electric storage unit 11E stops discharging.

The entire electric storage units store 11B, 11A, 11D and 11E as the already-discharged ID history, and the electric storage unit 11E selects an electric storage unit, based on the content 11C of the undischarged ID history, that is, the electric storage unit 11E selects the electric storage unit 11C. Then, the electric storage unit 11E notifies the electric storage unit 11C that the voltage of the electric storage unit 11E becomes equal to or lower than the predetermined voltage.

Also, before the discharging of the electric storage unit connected to the upstream side is started, the short circuit of the electric storage unit 11E is set to a conduction state. Specifically, the power input unit $E_3$ and the power output unit $E_2$ are set to a short-circuit state.

In this state, the electric storage unit 11C corresponds to the single electric storage unit. Also, electric storage units having power output units 53 ($B_4$, $F_2$) connected to power input units 51 ($C_1$, $C_5$) of the electric storage unit 11C are the electric storage unit 11B and the electric storage unit 11F. Since 11B is contained in the already-discharged ID history stored in the electric storage unit 11C, the electric storage unit 11F corresponds to the electric storage unit connected to the more upstream side than the single electric storage unit, but the electric storage unit 11B is excluded from the electric storage units connected to the more upstream side than the single storage unit. As described above, the electric storage unit 11F corresponds to the electric storage unit connected to the more upstream side than the single electric storage unit. The electric storage unit 11C stores 11F as the undischarged ID history. Also, the discharging from the electric storage unit 11F connected to the upstream side of the electric storage unit (single electric storage unit) 11C is prohibited until the voltage of the electric storage unit (single electric storage unit) 11C becomes equal to or lower than the predetermined voltage. Specifically, the inflow of power from the power input unit $C_5$ is prohibited.

The discharging of the electric storage unit 11C connected to the more upstream side than the electric storage unit (single electric storage unit) 11E is started through the electric storage unit (single electric storage unit) 11E.

[Step-550]

When the voltage of the electric storage unit (single electric storage unit) 11C becomes equal to or lower than the predetermined voltage, the electric storage unit 11C stops discharging.

The entire electric storage units store 11B, 11A, 11D, 11E and 11C as the already-discharged ID history, and the electric storage unit 11C selects an electric storage unit, based on the content 11F of the undischarged ID history, that is, the electric storage unit 11C selects the electric storage unit 11F. Then, the electric storage unit 11C notifies the electric storage unit 11F that the voltage of the electric storage unit 11C becomes equal to or lower than the predetermined voltage. Also, before the discharging of the electric storage unit connected to the upstream side is started, the short circuit of the electric storage unit 11C is set to a conduction state. Specifically, the power input unit $C_5$ and the power output unit $C_6$ are set to a short-circuit state.

In this state, an electric storage unit having a power output unit 53 connected to a power input unit 51 of the electric storage unit 11F is the electric storage unit 11E. Since 11E is contained in the already-discharged ID history, the electric storage unit 11E is excluded from the electric storage units connected to the more upstream side than the single storage unit. Therefore, since there is no electric storage unit connected to the more upstream side than the single electric storage unit, the electric storage unit 11F stores NULL as the uncharged ID history.

The discharging of the electric storage unit 11F connected to the more upstream side than the electric storage unit (single electric storage unit) 11C is started through the electric storage unit (single electric storage unit) 11C.

[Step-560]

When the voltage of the electric storage unit (single electric storage unit) 11F becomes equal to or lower than the predetermined voltage, the electric storage unit 11F stops discharging. Since the undischarged ID history is NULL, the parent electric storage unit 11B checks the already-discharged ID history and checks whether there is an electric storage unit that does not yet perform discharging. In the fifth embodiment, since the entire electric storage units finish discharging, the discharging process is completed. In this manner, the repetition of the discharging process in the rechargeable battery cells constituting the entire electric storage units has been completed.

Sixth Embodiment

A sixth embodiment also is a modification of the fourth embodiment. In the sixth embodiment, as with the third embodiment, an electric storage unit group 10 is connected to a controller 16 through a communication unit 17. The discharging of the electric storage unit group 10 is performed under the control of the controller 16. A conceptual diagram of the electric storage unit group of the sixth embodiment is similar to that illustrated in FIG. 4(B).

Hereinafter, a method for discharging an electric storage unit group and a method for supplying and receiving power according to a sixth embodiment will be described.

[Step-600]

The controller 16 inquires of the electric storage units 11A, 11B, 11C, 11D, 11E and 11F about completion of discharge start preparation. When the entire electric storage units 11A, 11B, 11C, 11D, 11E and 11F have completed the discharge start preparation, the discharging of the rechargeable battery cell 30 of the electric storage unit 11C is started.

In this state, the electric storage unit 11C corresponds to the single electric storage unit. Also, electric storage units having power output units 53 ($B_4$, $F_2$) connected to power input units 51 ($C_1$, $C_5$) of the electric storage unit 11C are the electric storage unit 11B and the electric storage unit 11F. Therefore, the electric storage unit 11B and the electric storage unit 11F correspond to the electric storage units connected to the more upstream side than the single electric storage unit. However, even in the sixth embodiment, as with the fourth embodiment, the electric storage unit 11F is set as the electric storage unit connected to the more upstream side than the single electric storage unit, and the controller 16 stores the identification number 11F of the electric storage unit 11F as the undischarged ID history. Also, the controller 16 stores the identification number 11B of the electric storage unit 11B as the undischarged pending ID history. Also, during the discharging of the electric storage unit (single electric storage unit) 11C, the discharging from the electric storage unit 11B and the electric storage unit 11F connected to the upstream side of the electric storage unit (single electric storage unit) 11C is prohibited. Specifically, the inflow of power from the power input units $C_1$ and $C_5$ is prohibited.

[Step-610]

When a voltage of the electric storage unit (single electric storage unit) 11C becomes equal to or lower than a predetermined voltage, the electric storage unit (single electric storage unit) 11C stops discharging under the control of the controller 16.

In the controller 16, 11C is stored as the already-discharged ID history. Furthermore, under the control of the controller 16, an electric storage unit is selected, based on the content 11F of the undischarged ID history (that is, the electric storage unit 11F is selected). Also, before the discharging of the electric storage unit 11F is started, the short circuit of the electric storage unit 11C is set to a conduction state. Specifically, the power input unit $C_5$ and the power output unit $C_4$ are set to a short-circuit state.

In this state, the electric storage unit 11F corresponds to the single electric storage unit. Also, an electric storage unit having a power output unit 53 ($E_4$) connected to a power input unit 51 ($F_1$) of the electric storage unit 11F is the electric storage unit 11E. Therefore, the electric storage unit 11E corresponds to the electric storage unit connected to the more upstream side than the single electric storage unit. The controller 16 stores 11E as the undischarged ID history. Also, the discharging from the electric storage unit 11E connected to the upstream side of the electric storage unit (single electric storage unit) 11F is prohibited until the voltage of the electric storage unit (single electric storage unit) 11F becomes equal to or lower than the predetermined voltage. Specifically, the inflow of power from the power input unit $F_1$ is prohibited.

The discharging of the electric storage unit 11F connected to the upstream side of the electric storage unit (single electric storage unit) 11C is started.

[Step-620]

When the voltage of the electric storage unit (single electric storage unit) 11F becomes equal to or lower than the predetermined voltage, the electric storage unit 11F stops discharging under the control of the controller 16.

The controller 16 stores 11C and 11F as the already-discharged ID history, and the controller 16 selects an electric storage unit, based on the content 11E of the undischarged ID history (that is, the controller 16 selects the electric storage unit 11E). Also, before the discharging of the electric storage unit connected to the upstream side is started, the short circuit of the electric storage unit 11F is set to a conduction state. Specifically, the power input unit $F_1$ and the power output unit $F_2$ are set to a short-circuit state.

In this state, the electric storage unit 11E corresponds to the single electric storage unit. Also, electric storage units having power output units 53 ($D_4$, $C_6$) connected to power input units 51 ($E_1$, $E_3$) of the electric storage unit 11E are the electric storage unit 11D and the electric storage unit 11C. Since 11C is contained in the already-discharged ID history stored in the controller 16, the electric storage unit 11D corresponds to the electric storage unit connected to the more upstream side than the single electric storage unit, but the electric storage unit 11C is excluded from the electric storage units connected to the more upstream side than the single storage unit. As described above, the electric storage unit 11D corresponds to the electric storage unit connected to the more upstream side than the single electric storage unit. The controller 16 stores 11D as the undischarged ID history. Also, the discharging from the electric storage unit 11D connected to the upstream side of the electric storage unit (single electric storage unit) 11E is prohibited until the voltage of the electric storage unit (single electric storage unit) 11E becomes equal to or lower than the predetermined voltage. Specifically, the inflow of power from the power input unit $E_1$ is prohibited.

The discharging of the electric storage unit 11E connected to the more upstream side than the electric storage unit (single electric storage unit) 11F is started through the electric storage unit (single electric storage unit) 11F.

[Step-630]

When the voltage of the electric storage unit (single electric storage unit) 11E becomes equal to or lower than the predetermined voltage, the electric storage unit 11E stops discharging under the control of the controller 16.

The controller 16 stores 11C, 11F and 11E as the already-discharged ID history, and the controller 16 selects an electric storage unit, based on the content 11D of the undischarged ID history (that is, the controller 16 selects the electric storage unit 11D). Also, before the discharging of the electric storage unit connected to the upstream side is started, the short circuit of the electric storage unit 11E is set to a conduction state. Specifically, the power input unit $E_1$ and the power output unit $E_4$ are set to a short-circuit state.

In this state, the electric storage unit 11D corresponds to the single electric storage unit. Also, an electric storage unit having a power output unit 53 ($B_6$) connected to a power input unit 51 ($D_3$) of the electric storage unit 11D is the electric storage unit 11B. Therefore, the electric storage unit 11B corresponds to the electric storage unit connected to the more upstream side than the single electric storage unit. The controller 16 stores 11B as the undischarged ID history. Also, the discharging from the electric storage unit 11B connected to the upstream side of the electric storage unit (single electric storage unit) 11D is prohibited until the voltage of the electric storage unit (single electric storage unit) 11D becomes equal to or lower than the predetermined voltage. Specifically, the inflow of power from the power input unit $D_3$ is prohibited.

The discharging of the electric storage unit 11D connected to the more upstream side than the electric storage unit (single electric storage unit) 11E is started through the electric storage unit (single electric storage unit) 11E.

[Step-640]

When the voltage of the electric storage unit (single electric storage unit) 11D becomes equal to or lower than the predetermined voltage, the electric storage unit 11D stops discharging under the control of the controller 16.

The controller 16 stores 11C, 11F, 11E and 11D as the already-discharged ID history, and the controller 16 selects an electric storage unit, based on the content 11B of the undischarged ID history. Also, before the discharging of the electric storage unit connected to the upstream side is started, the short circuit of the electric storage unit 11D is set to a conduction state. Specifically, the power input unit $D_3$ and the power output unit $D_4$ are set to a short-circuit state.

In this state, the electric storage unit 11B corresponds to the single electric storage unit. Also, electric storage units having power output units 53 ($A_4$, $E_2$) connected to power input units 51 ($B_1$, $B_5$) of the electric storage unit 11B are the electric storage unit 11A and the electric storage unit 11E. Since 11E is contained in the already-discharged ID history stored in the controller 16, the electric storage unit 11A corresponds to the electric storage unit connected to the more upstream side than the single electric storage unit, but the electric storage unit 11E is excluded from the electric storage units connected to the more upstream side than the single storage unit. As described above, the electric storage unit 11A corresponds to the electric storage unit connected to the more upstream side than the single electric storage unit. The controller 16 stores 11A as the undischarged ID history. Also, the discharging from the electric storage unit 11A connected to the upstream side of the electric storage unit (single electric storage unit) 11B is prohibited until the voltage of the electric storage unit (single electric storage unit) 11B becomes equal to or lower than the predetermined voltage. Specifically, the inflow of power from the power input unit $B_1$ is prohibited.

The discharging of the electric storage unit 11B connected to the more upstream side than the electric storage unit (single electric storage unit) 11D is started through the electric storage unit (single electric storage unit) 11D.

[Step-650]

When the voltage of the electric storage unit (single electric storage unit) 11B becomes equal to or lower than the predetermined voltage, the electric storage unit 11B stops discharging under the control of the controller 16.

The controller 16 stores 11C, 11F, 11E, 11D and 11B as the already-discharged ID history, and the controller 16 selects an electric storage unit, based on the content 11A of the undischarged ID history. Also, before the discharging of the electric storage unit connected to the upstream side is started, the short circuit of the electric storage unit 11B is set to a conduction state. Specifically, the power input unit $B_1$ and the power output unit $B_6$ are set to a short-circuit state.

In this state, an electric storage unit having a power output unit 53 connected to a power input unit 51 of the electric storage unit 11A is the electric storage unit 11D. Since 11D is contained in the already-discharged ID history, the electric storage unit 11D is excluded from the electric storage units connected to the more upstream side than the single storage unit. Therefore, since there is no electric storage unit connected to the more upstream side than the single electric storage unit, the electric storage unit 11A stores NULL as the uncharged ID history.

The discharging of the electric storage unit 11A connected to the more upstream side than the electric storage unit (single electric storage unit) 11B is started through the electric storage unit (single electric storage unit) 11B.

[Step-660]

When the voltage of the electric storage unit (single electric storage unit) 11A becomes equal to or lower than the predetermined voltage, the electric storage unit 11A stops discharging. Since the undischarged ID history is NULL, the controller 16 checks the already-discharged ID history and checks whether there is an electric storage unit that does not yet perform discharging. In the sixth embodiment, since the entire electric storage units finish discharging, the discharging process is completed. In this manner, the repetition of the discharging process in the rechargeable battery cells constituting the entire electric storage units has been completed.

Seventh Embodiment

A seventh embodiment is a modification of the sixth embodiment. In the seventh embodiment, the controller 16 determines discharge order of electric storage units, based on an adjacency matrix. FIG. 6 illustrates a power route in a method for discharging an electric storage unit group and a method for supplying and receiving power according to a seventh embodiment.

In the seventh embodiment, the controller 16 obtains connection information of power input units 51 and power output units 53 of eight electric storage units 11A to 11H, and establishes an adjacency matrix from the connection information. For example, when the load 14 is connected to the electric storage unit 11E, the controller 16 searches the longest discharge route causing no discharging loop, based on the adjacency matrix. Specifically, the discharge route shown in Table 1 below is obtained. Also, "11 plus alphabet" in Table 1 represents the identification number (ID) of the electric storage unit, "→" represents an upstream and downstream relation, the electric storage unit of the left side of "→" is positioned at the upstream side, and the electric storage unit of the right side of "→" is positioned at the downstream side.

TABLE 1

| |
| --- |
| 11C → 11A → 11D → 11B → 11E |
| 11C → 11F → 11D → 11B → 11E |
| 11G → 11F → 11D → 11B → 11E |
| 11H → 11F → 11D → 11B → 11E |
| 11C → 11A → 11D → 11G → 11E |
| 11B → 11A → 11D → 11G → 11E |
| 11C → 11F → 11D → 11G → 11E |
| 11H → 11F → 11D → 11B → 11E |

Among eight types of discharge routes, the greatest variation of subsequent electric storage units is 11X→ 11F→ 11D→ 11B→ 11E. Also, 11X represents any one of 11C, 11G, and 11H.

Therefore, the controller 16 sets the discharge route as a main discharge route, and controls the execution of the discharge process. Also, electric storage units having earlier identification numbers are preferentially discharged. Also, specific operations in each step are the same as the operations described in the sixth embodiment.

Hereinafter, a method for discharging an electric storage unit group and a method for supplying and receiving power according to the seventh embodiment will be described.

[Step-700]

The controller 16 inquires of the electric storage units 11A to 11H about completion of discharge start preparation. When the entire electric storage units 11A to 11H have completed the discharge start preparation, the discharging of the rechargeable battery cell 30 of the electric storage unit 11E is started. In this state, the electric storage unit 11E corresponds to the single electric storage unit. Also, the electric storage unit 11B is the electric storage unit connected to the more upstream side than the single electric storage unit.

[Step-710]

When a voltage of the electric storage unit (single electric storage unit) 11E becomes equal to or lower than a predetermined voltage, the electric storage unit (single electric storage unit) 11E stops discharging under the control of the controller 16. The discharging of the electric storage unit 11B is started. In this state, the electric storage unit 11B corresponds to the single electric storage unit. Also, the electric storage unit 11D is the electric storage unit connected to the more upstream side than the single electric storage unit.

[Step-720]

When a voltage of the electric storage unit (single electric storage unit) 11B becomes equal to or lower than a predetermined voltage, the electric storage unit (single electric unit) 11B stops discharging under the control of the controller 16. The discharging of the electric storage unit 11D is started. In this state, the electric storage unit 11D corresponds to the single electric storage unit. Also, the electric storage unit 11F is the electric storage unit connected to the more upstream side than the single electric storage unit.

[Step-730]

When a voltage of the electric storage unit (single electric storage unit) 11D becomes equal to or lower than a predetermined voltage, the electric storage unit (single electric unit) 11D stops discharging under the control of the controller 16. The discharging of the electric storage unit 11F is started. In this state, the electric storage unit 11F corresponds to the single electric storage unit. Also, the electric storage unit 11C is the electric storage unit connected to the more upstream side than the single electric storage unit.

[Step-740]

When a voltage of the electric storage unit (single electric storage unit) 11F becomes equal to or lower than a predetermined voltage, the electric storage unit (single electric unit) 11F stops discharging under the control of the controller 16. The discharging of the electric storage unit 11C is started. In this state, the electric storage unit 11C corresponds to the single electric storage unit. Also, there are no electric storage units connected to the more upstream side than the single electric storage unit.

[Step-750]

When a voltage of the electric storage unit (single electric storage unit) 11C becomes equal to or lower than a predetermined voltage, the electric storage unit (single electric unit) 11C stops discharging under the control of the controller 16. The discharging of the electric storage unit 11G is started. In this state, the electric storage unit 11G corresponds to the single electric storage unit. Also, there are no electric storage units connected to the more upstream side than the single electric storage unit.

[Step-760]

When a voltage of the electric storage unit (single electric storage unit) 11G becomes equal to or lower than a predetermined voltage, the electric storage unit (single electric storage unit) 11G stops discharging under the control of the controller 16. The discharging of the electric storage unit 11H is started. In this state, the electric storage unit 11H corresponds to the single electric storage unit. Also, there are no electric storage units connected to the more upstream side than the single electric storage unit.

[Step-770]

When a voltage of the electric storage unit (single electric storage unit) 11H becomes equal to or lower than a predetermined voltage, the electric storage unit (single electric unit) 11H stops discharging under the control of the controller 16. The discharging of the electric storage unit 11A is started. In this state, the electric storage unit 11A corresponds to the single electric storage unit. Also, there are no electric storage units connected to the more upstream side than the single electric storage unit.

[Step-780]

When a voltage of the electric storage unit (single electric storage unit) 11A becomes equal to or lower than a predetermined voltage, the electric storage unit (single electric unit) 11A stops discharging under the control of the controller 16. The controller 16 checks the already-discharged ID history and checks whether there is an electric storage unit that does not yet perform discharging. In the seventh embodiment, since the entire electric storage units finish discharging, the discharging process is completed. In this manner, the repetition of the charging process in the rechargeable battery cells constituting the entire electric storage units has been completed.

Eighth Embodiment

An eighth embodiment relates to a method for determining a charging/discharging route in an electric storage unit group by using an adjacency matrix (N-th order square matrix A). N is the number of electric storage units constituting the electric storage unit group.

For example, five electric storage units are connected as illustrated in FIG. 9. Also, the base of the arrow corresponds to the power output unit in the electric storage unit, and the leading end of the arrow corresponds to the power input unit in the electric storage unit. An identification number (ID) of an electric storage unit directly connected to the electric storage unit is referred to as connection information. When a power output unit of an electric storage unit whose identification number is 2 is connected to a power input units of an electric storage unit whose identification number is 3 and an electric storage unit whose identification number is 5, the electric storage unit whose identification number is 2 notifies the parent electric storage unit of the identification numbers of 3 and 5 as the connection information. The parent electric storage unit generates an N-th order square matrix A from the connection information.

An electric storage unit whose identification number is i is referred to as an electric storage unit [i]. When an identification number of an electric storage unit [j] is contained in the connection information of the electric storage unit [i], that is, when an i-th electric storage unit and a j-th electric storage unit are directly connected to each other, a value of an element [i, j] of the N-th order square matrix A is set to 1. When an identification number of an electric storage unit [j] is not contained in the connection information of the electric storage unit [i], that is, when an i-th electric storage unit and a j-th electric storage unit are not directly connected to each other, a value of an element [i, j] of the N-th order square matrix A is set to 0. The generated adjacency matrix (N-th order square matrix A) also is transmitted to the entire electric storage units. $1 \le i \le N$, $1 \le j \le N$.

When five electric storage units are connected as illustrated in FIG. 9, the N-th order square matrix A is as follows.

Since connection information of the first row of the N-th order square matrix A, that is, an electric storage unit [1], is 2 and 3, the first row of the N-th order square matrix A becomes [0, 1, 1, 0, 0].

Since connection information of the second row of the N-th order square matrix A, that is, an electric storage unit [2], is 3 and 5, the second row of the N-th order square matrix A becomes [0, 0, 1, 0, 1].

Since connection information of the third row of the N-th order square matrix A, that is, an electric storage unit [3], is 5, the third row of the N-th order square matrix A becomes [0, 0, 0, 0, 1].

Since connection information of the fourth row of the N-th order square matrix A, that is, an electric storage unit [4], is 1 and 2, the fourth row of the N-th order square matrix A becomes [1, 1, 0, 0, 0].

Since connection information of the fifth row of the N-th order square matrix A, that is, an electric storage unit [5], is 1 and 4, the fifth row of the N-th order square matrix A becomes [1, 0, 0, 1, 0].

Therefore, the N-th order square matrix A is as follows. Also, square matrix $A^2$ of the N-th order square matrix A and cube matrix $A^3$ of the N-th order square matrix A are as follows.

$$A = \begin{bmatrix} 0 & 1 & 1 & 0 & 0 \\ 0 & 0 & 1 & 0 & 1 \\ 0 & 0 & 0 & 0 & 1 \\ 1 & 1 & 0 & 0 & 0 \\ 1 & 0 & 0 & 1 & 0 \end{bmatrix}$$

$$A^2 = \begin{bmatrix} 0 & 0 & 1 & 0 & 2 \\ 1 & 0 & 0 & 1 & 1 \\ 1 & 0 & 0 & 1 & 0 \\ 0 & 1 & 2 & 0 & 1 \\ 1 & 2 & 1 & 0 & 0 \end{bmatrix}$$

$$A^3 = \begin{bmatrix} 2 & 0 & 0 & 2 & 1 \\ 2 & 2 & 1 & 1 & 0 \\ 1 & 2 & 1 & 0 & 0 \\ 1 & 0 & 1 & 1 & 3 \\ 0 & 1 & 3 & 0 & 3 \end{bmatrix}$$

By the way, an element [i, j] of $A^m$ represents the same number of routes as that when passing through (m−1) electric storage units while tracing from the electric storage unit [i] to the electric storage unit [j]. When the units tracing a route are an electric storage unit [a], an electric storage unit [b], and an electric storage unit [c], the route is described as a→b→c.

For example, from the electric storage unit [1] to the electric storage unit [5], the route passing through one electric storage unit is two: 1→3→5 and 1→2→5. A value of an element [1, 5] of $A^2$ is 2, which is consistent with the number of the routes.

An element [1, 5] of $A^2$ will be described as an example. If each element of A is expressed as $B_{i,j}$, the element [1, 5] of $A^2$ is as follows.
element [1,5] of $$A^2 = B_{1,1} \times B_{1,5} + B_{1,2} \times B_{2,5} + B_{1,3} \times B_{3,5} + B_{1,4} \times B_{4,5} + B_{1,5} \times B_{5,5}.$$

When a route directed from the electric storage unit [1] to the electric storage unit [1] exists and a route directed from the electric storage unit [1] to the electric storage unit [5] exists, a value of the first term ($B_{1,1} \times B_{1,5}$) on the right-hand side of the above equation becomes 1. Also, when a route directed from the electric storage unit [1] to the electric storage unit [2] exists and a route directed from the electric storage unit [2] to the electric storage unit [5] exists, a value of the second term ($B_{1,2} \times B_{2,5}$) on the right-hand side of the above equation becomes 1. In addition, when a route directed from the electric storage unit [1] to the electric storage unit [3] exists and a route directed from the electric storage unit [3] to the electric storage unit [5] exists, a value of the third term ($B_{1,3} \times B_{3,5}$) on the right-hand side of the above equation becomes 1. In addition, when a route directed from the electric storage unit [1] to the electric storage unit [4] exists and a route directed from the electric storage unit [4] to the electric storage unit [5] exists, a value of the fourth term ($B_{1,4} \times B_{4,5}$) on the right-hand side of the above equation becomes 1. Furthermore, when a route directed from the electric storage unit [1] to the electric storage unit [5] exists and a route directed from the electric storage unit [5] to the electric storage unit [5] exists, a value of the fifth term ($B_{1,5} \times B_{5,5}$) on the right-hand side of the above equation becomes 1. Therefore, the value of the element [1, 5] of $A^2$ is equal to the total number of the routes directed from the electric storage unit [1] to the electric storage unit [5].

Likewise, an element [1, 5] in the product of $A^{m-1}$ and A will be described as an example. If each element [1, 5] of $A^{m-1}$ is expressed as $C_{i,j}$, element [1, 5] of $(A^{m-1} \times A) = C_{1,1} \times B_{1,5} + C_{1,2} \times B_{2,5} + C_{1,3} \times B_{3,5} + C_{1,4} \times B_{4,5} + C_{1,5} \times B_{5,5}$ A value of the first term ($C_{1,1} \times B_{1,5}$) on the right-hand side of the above equation becomes the product of the number of routes on which (m−2) electric storage units exist on the route directed from the electric storage unit [1] to the electric storage unit [1] and the value of routes directed from the electric storage unit [1] to the electric storage unit [5] (when the electric storage unit [1] and the electric storage unit [5] are connected, the value is 1, and when not connected, the value is 0). Also, a value of the second term ($C_{1,2} \times B_{2,5}$) on the right-hand side of the above equation becomes the product of the number of routes on which (m−2) electric storage units exist on the route directed from the electric storage unit [1] to the electric storage unit [2] and the number of routes directed from the electric storage unit [2] to the electric storage unit [5] (when the electric storage unit [2] and the electric storage unit [5] are connected, the number is 1, and when not connected, the number is 0). Also, a value of the third term ($C_{1,3} \times B_{3,5}$) becomes the product of the number of routes on which (m−2) electric storage units exist on the route directed from the electric storage unit [1] to the electric storage unit [3] and the number of routes directed from the electric storage unit [3] to the electric storage unit [5] (when the electric storage unit [3] and the electric storage unit [5] are connected, the number is 1, and when not connected, the number is 0). Also, a value of the fourth term ($C_{1,4} \times B_{4,5}$) on the right-hand side of the above equation becomes the product of the number of routes on which (m−2) electric storage units exist on the route directed from the electric storage unit [1] to the electric storage unit [4] and the number of routes directed from the electric storage unit [4] to the electric storage unit [5] (when the electric storage unit [4] and the electric storage unit [5] are connected, the value is 1, and when not connected, the value is 0). Furthermore, a value of the fifth term ($C_{1,5} \times B_{5,5}$) on the right-hand side of the above equation becomes the product of the number of routes on which (m−2) electric storage units exist on the route directed from the electric storage unit [1] to the electric storage unit [5] and the number (1) of routes directed from the electric storage unit [5] to the electric storage unit [5]. Therefore, the value of the element [1, 5] of $A^m$ is equal to the total number of the routes on which (m−1) electric storage units exist on the route directed from the electric storage unit [1] to the electric storage unit [5].

Next, the derivation of the shortest route from the electric storage unit [i] to the electric storage unit [j] will be described.

By the way, by calculating a minimum m value, at which the value of the element [i, j] of the matrix $A^m$, which is the m-th power of the N-th order square matrix A, is nonzero, the number of electric storage units existing from the i-th electric storage unit to the j-th electric storage unit is calculated as (m−1). The value of m is the shortest route length. In this manner, first, the element [i, j] is sequentially checked from the adjacency matrix (N-th order square matrix A), and $A^2$, $A^3$ . . . are calculated until the value of the element [i, j] becomes nonzero.

When the value becomes nonzero and m=1, it is apparent that the shortest route is i→j. That is, when m=1, the j-th electric storage unit from the i-th electric storage unit is determined as the charging/discharging route. In other words, the charging/discharging route of the j-th electric storage unit from the i-th electric storage unit corresponds to a state in which the i-th electric storage unit and the j-th electric storage are directly connected to each other.

On the other hand, when m≥2, by calculating a minimum $k_{m'+1}$ at which an element [i, $k_{m'+1}$] (where, m'=1, 2, 3 . . . , m−1, and $k_1$=j) in a matrix $A^{m-m'}$, which is the (m−m')-th power of the N-th order square matrix A, and an element [$k_{m'+1}$, $k_{m'}$] in the N-th order square matrix A are nonzero at the same time, a $k_{m'+1}$-th electric storage unit is designated as an electric storage unit that is one ahead of the $k_{m'}$-th electric storage unit in electric storage units existing from the i-th electric storage unit to the $k_{m'}$-th electric storage unit. This operation is repeated until the value of m' becomes (m−1) from 1, and the electric storage units existing from the i-th electric storage unit to the j-th electric storage unit are designated. Furthermore, this operation is performed on the entire electric storage units to determine the charging/discharging route from the i-th electric storage unit to the j-th electric storage unit.

Specifically, when 2≤m, the i-th row of $A^{m-1}$ and the j-th column of A are compared with each other. When the number of the entire electric storage units is N, first, m' is set to m'=1, and a minimum $k_{m'+1}$, at which [i, $k_{m'+1}$] of $A^{m-1}$ and [$k_{m'+1}$, j] of A are nonzero at the same time, is found when 1≤$k_{m'+1}$≤N. When the value of $k_{m'+1}$ at that time is K1, the $k_{m'+1}$-th electric storage unit (electric storage unit [$K_1$]) is designated as the electric storage unit, which is one ahead of the electric storage unit [j], in the shortest route from the electric storage unit [i] to the electric storage unit [j]. For example, when focusing on the element [3, 2], $A^3$ has a nonzero value at the first time in the adjacency matrixes (N-th order square matrix A), $A^2$ and $A^3$. That is, it can be seen that the shortest route length from the electric storage unit [3] to the electric storage unit [2] is 3, and the route has a form of 3→x→y→2.

When looking at the third row [1, 0, 0, 1, 0] of $A^2$ and the second row [1, 0, 0, 1, 0] of A, both have a nonzero value at the first time in the first element. Therefore, it can be seen that the value of $K_1$ is 1, and the shortest route is 3→x→1→2.

Next, when m'=2, a minimum $k_{m'+1}$, at which [i, $k_{m'+1}$] of $A^{m-2}$ and [$k_{m'+1}$, $K_1$] of A are nonzero at the same time, is found. When the value of $k_{m'+1}$ at that time is $K_2$, the $k_{m'+1}$-th electric storage unit (electric storage unit [$K_2$]) is designated as the electric storage unit which is one ahead of the electric storage unit [$K_1$]. By repeating this operation, the charging/discharging route (shortest route) from the i-th electric storage unit to the j-th electric storage unit may be determined as i → . . . →$K_2$→$K_1$→j.

In the above-described example, the third row [0, 0, 0, 0, 1] of A and the first column [0, 0, 0, 1, 1] of A are compared with each other. Since both have a nonzero value in the fifth element at the first time, it can be seen that the value of $K_2$ is 5, and the shortest route is 3→5→1→2.

When the electric storage unit [j] is connected to the load, the electric storage unit [j] notifies that effect to the parent electric storage unit. The parent electric storage unit calculates the shortest route from each electric storage unit to the electric storage unit [j] in the entire electric storage units by using the above-described method.

First, although not limited thereto, for example, the discharging is started on the shortest route from the electric storage unit [1]. For example, when the route is 1→$j_2$→$j_1$→j, the discharging is started from the electric storage unit [j]. When the discharging of the electric storage unit [j] is completed, the electric storage unit [j] sets the short circuit to a conduction state so that the discharging is performed from the electric storage unit [$j_1$] to the load. When the discharging of the electric storage unit [$j_1$] is completed, the electric storage unit [$j_1$] sets the short circuit to a conduction state so that the discharging is performed from the electric storage unit [$j_2$] to the load. Then, the discharging is performed from the electric storage unit [$j_2$] to the load. These repetition is performed. Next, for example, the discharging is equally performed on the shortest route from the electric storage unit [2]. On the way of the route, when there is an electric storage unit that has already been completely discharged, the short circuit of the relevant electric storage unit is set to a conduction state. By repeating such operations until the electric storage unit [N], the discharging from the entire electric storage units can be surely performed. Also, since only the shortest route is used, power transmission loss between the electric storage units can be minimized.

In regard to charging, when the electric storage unit [i] is connected to the power supply, the shortest route from the electric storage unit [i] to the electric storage unit [j] is derived and the charging is performed. If this operation is performed on the entire electric storage units, the charging to the entire electric storage units can be surely performed. Even in the case of the charging, the short circuits of the electric storage units on the way of the route are set to a conduction state. As with the discharging, since only the shortest route is used, power transmission loss between the electric storage units can be minimized.

When the rechargeable battery cell constituting the single electric storage unit is fully charged, based on the charging/discharging route determined in such a manner, the charging of the single electric storage unit is stopped, and the electric storage unit connected to a more downstream side than the single electric storage unit is charged through the single electric storage unit. Alternatively, when a voltage of the rechargeable battery cell constituting the single electric storage unit becomes equal to or lower than a predetermined voltage, the discharging from the single electric storage unit is stopped, and the discharging of the electric storage unit connected to the upstream side of the single electric storage unit is started.

Ninth Embodiment

Figure 10:
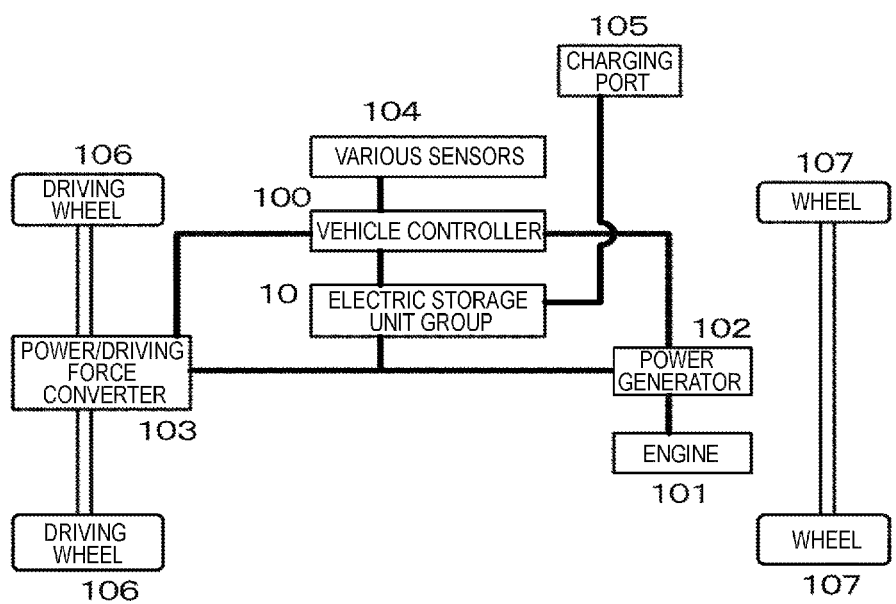
FIG. 10 is a diagram illustrating a configuration of a hybrid vehicle according to a ninth embodiment.

A ninth embodiment relates to electric vehicles according to the first aspect and the second aspect of the present disclosure, and in particular, to electric automobiles. FIG. 10 illustrates a configuration of a hybrid vehicle according to a ninth embodiment.

The electric vehicle of the ninth embodiment includes: an electric storage unit group 10 in which a plurality of electric storage units 11 having rechargeable battery cells 30 are linearly or reticulately connected; a power generator 102; and a power/driving force converter 103. The electric storage unit group 10 is connected to the power generator 102 for charging the electric storage units 11 at an upstream side of the electric storage unit group 10, and is connected to the power/driving force converter 103 at a downstream side of the electric storage unit group 10.

As described above in the first to third and eighth embodiments, when the rechargeable battery cell 30 constituting a single electric storage unit 11 is fully charged, the charging of the single electric storage unit 11 is stopped, and an electric storage unit 1 connected to a more downstream side than the single electric storage unit 11 is charged through the single electric storage unit 11. Alternatively, as described above in the fourth to eighth embodiments, when a voltage of a rechargeable battery cell 30 constituting a single electric storage unit 11 becomes equal to or lower than a predetermined voltage, the discharging from the single electric storage unit 11 is stopped, and the discharging of an electric storage unit 11 connected to an upstream side of the single electric storage unit 11 is started.

The electric automobile of the ninth embodiment is an automobile that is driven by the power/driving force converter 103 by using power generated in the power generator 102 driven by an engine 101, or by accumulating the power in the electric storage unit group 10 once and using the power from the electric storage unit group 10. The electric automobile further includes, for example, a vehicle controller 100, various sensors 104, a charging port 105, a driving wheel 106, and a wheel 107.

The electric automobile of the ninth embodiment is driven by using the power/driving force converter 103 as a power source. The power/driving force converter 103 includes, for example, a driving motor. For example, the power/driving force converter 103 is operated by the power of the electric storage unit group 10, and the torque of the power/driving force converter 103 is transmitted to the driving wheel 106. Also, as the power/driving force converter 103, both of AC motor and DC motor can be applied. The variety of sensors 104 controls an engine speed through the vehicle controller 100, or controls the opening degree of a throttle valve (not illustrated) (throttle opening degree). The variety of sensors 104 include a speed sensor, an acceleration sensor, an engine speed sensor, and the like. The torque of the engine 101 is transmitted to the power generator 102, and power generated due to the torque by the power generator 102 is accumulated in the electric storage unit group 10.

When the electric automobile is decelerated by a damping mechanism (not illustrated), a resisting force during deceleration is applied to the power/driving force converter 103 as a torque. Regenerative power generated due to the torque by the power/driving force converter 103 is accumulated in the electric storage unit group 10. Also, the electric storage unit group 10 can be supplied with power from an external power supply by using the charging port 105 as an input port, and accumulate the power. Alternatively, the power accumulated in the electric storage unit group 10 can be supplied to the exterior by using the charging port 105 as an output port.

Although not illustrated, the electric automobile may include an information processing device that performs information processing related to vehicle control, based on information about the electric storage unit group 10. Examples of the information processing device may include an information processing device that displays a remaining battery level, based on information about a remaining battery level of a rechargeable battery cell.

Also, the above description has been given based on the series hybrid vehicle that is driven by the power/driving force converter 103 by using the power generated in the power generator 102 driven by the engine 101 and by using the power accumulated in the electric storage unit group 10 once, but it is also applicable to a parallel hybrid vehicle that uses both the power of the engine 101 and the power of the power/driving force converter 103 as a driving source, and appropriately switches three methods, such as a driving by only the engine 101, a driving by only the power/driving force converter 103, and a driving by both the engine 101 and the power/driving force converter 103. Also, it is also applicable to a vehicle that is driven by only the driving motor, without using the engine.

In the above, the present disclosure has been described based on the preferred embodiments, but the present disclosure is not limited to these embodiments. In the embodiments, the configurations and structures of the electric storage unit and the electric storage unit group, the configurations of the housing, the rechargeable battery cell, the charging/discharging control unit, the power input unit, and the power output unit, and the structures of the controller, the charger, and the electronic device are exemplary, and can be appropriately modified. Also, the method for charging the electric storage unit and the method for supplying and receiving power, which have been described in any one of the first to third embodiments, and the method for discharging the electric storage unit and the method for supplying and receiving power, which have been described in any one of the fourth to seventh embodiments, can be combined. Also, the method for determining the charging/discharging route in the electric storage unit group, which has been described in the eighth embodiment, can be applied to the first to seventh embodiments and the ninth embodiment. In the embodiments, the electric storage unit group in which the plurality of electric storage units having rechargeable battery cells are reticulately connected has been described, but a plurality of electric storage units may be linearly connected.

At least one power input unit and at least one power output unit, which are disposed in the housing 20 and connected to the charging/discharging control unit 40, may be configured by, for example, a magnetic resonance method. Specifically, a power transmitting apparatus, such as a radio frequency power circuit or a matching circuit, and a power receiving apparatus, such as a matching circuit, a high-speed rectifying circuit, and a power converting circuit, are integrated into the charging/discharging control unit 40. The power output unit is configured by the power transmitting device connected to the matching circuit constituting the power transmitting apparatus, and the power input unit is configured by a power receiving device connected to the matching circuit constituting the power receiving apparatus.

Figure 7:
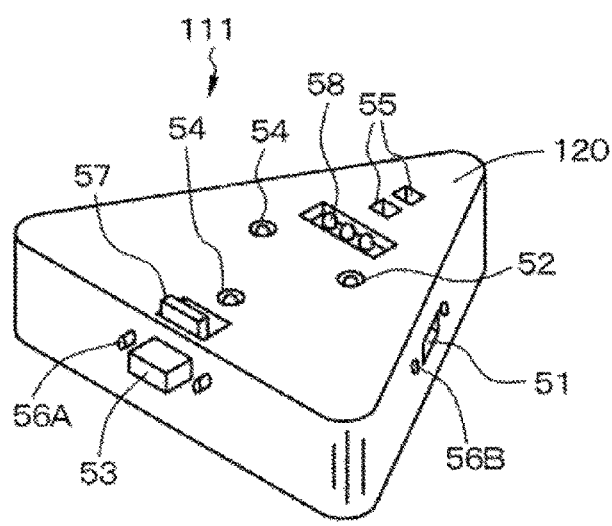
FIG. 7 is a schematic perspective view of an electric storage unit including a housing having an equilateral triangular prism shape.

For example, as illustrated in FIG. 7, the electric storage unit may be an electric storage unit 111 including a housing 120 having an equilateral triangular prism shape. In this case, reference numeral 56A denotes a pin, and reference numeral 56B denotes a hole portion fitted with the pin 56A. By fitting the pin 56A and the hole portion 56B in this manner, it is possible to prevent excessive force to the power input unit 51 and the power output unit 53 when the electric storage unit 11 is combined. Also, reference numeral 57 denotes a grip (knob) for taking the power output unit 53 in and out. In addition, reference numeral 58 denotes a display unit serving as a charging state display unit and a discharging state display unit or a remaining battery level display unit. The display unit 58 includes a plurality of aligned LEDs. The display unit 58 is connected to the charging/discharging control unit 40.

Figure 8:
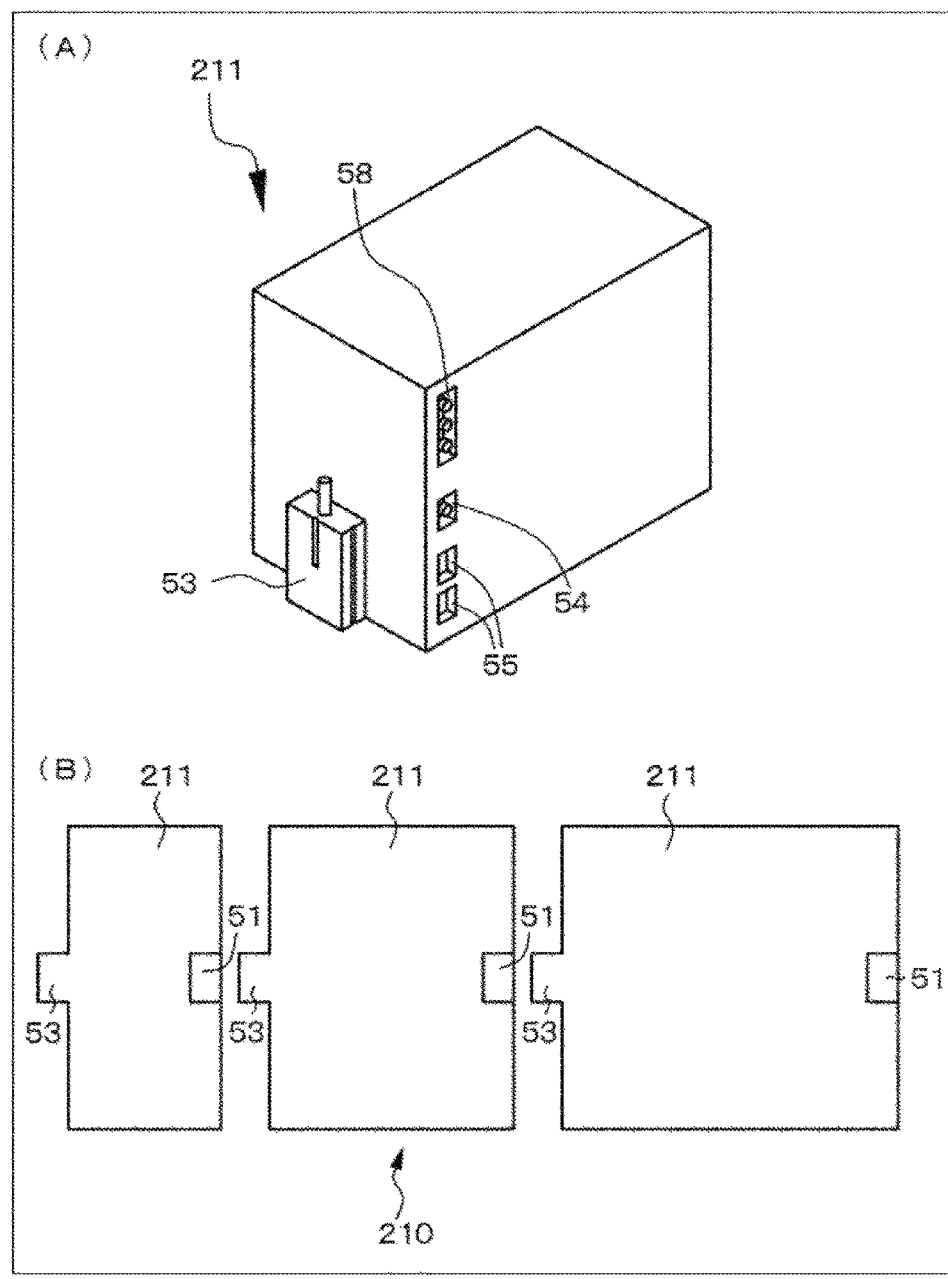
FIGS. 8(A) and 8(B) are a schematic perspective view of an electric storage unit including a housing having a quadrangular prism shape, and a conceptual diagram viewed from a bottom side of an electric storage unit group configured by a combination of three electric storage units, respectively.

Alternatively, as illustrated in the schematic perspective view of FIG. 8(A), the electric storage unit may be an electric storage unit 211 including a housing having a quadrangular prism shape (cuboid shape). Also, FIG. 8(B) is a conceptual diagram viewed from a bottom side of the electric storage unit group 210 configured by a combination of these three electric storage units 211.

Also, the present disclosure can take the following configurations.

[1] <Electric Storage Unit Group: First Aspect>

An electric storage unit group including:

a plurality of electric storage units having rechargeable battery cells and linearly or reticulately connected, wherein, at an upstream side of the electric storage unit group, the electric storage unit group is connected to a power supply for charging the electric storage units, and when a rechargeable battery cell constituting a single electric storage unit is fully charged, a charging of the single electric storage unit is stopped, and an electric storage unit connected to a more downstream side than the single electric storage unit is charged through the single electric storage unit.

[2] The electric storage unit group described in [1], wherein each of the electric storage units includes a short circuit, and when a rechargeable battery cell constituting a single electric storage unit is fully charged, an electric storage unit connected to a downstream side of the single electric storage unit is charged through a short circuit of the single electric storage unit.

[3] The electric storage unit group described in [1] or [2], wherein outflow of power to an electric storage unit connected to a downstream side of the single electric storage unit is prohibited until the single electric storage unit is fully charged.

[4] The electric storage unit group described in any one of [1] to [3], wherein the electric storage unit includes:

(A) a housing having a polygonal prism shape;

(B) a rechargeable battery cell stored in the housing;

(C) a charging/discharging control unit stored in the housing and connected to the rechargeable battery cell;

(D) at least one power input unit disposed in the housing and connected to the charging/discharging control unit; and (E) at least one power output unit disposed in the housing and connected to the charging/discharging control unit.

[5] <Electric Storage Unit Group: Second Aspect>

An electric storage unit group including:

a plurality of electric storage units having rechargeable battery cells and linearly or reticulately connected, wherein, at a downstream side of the electric storage unit group, the electric storage unit group is connected to a load, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

[6] The electric storage unit group described in [5], wherein each of the electric storage units includes a short circuit, and when a voltage of a rechargeable battery cell constituting the single electric storage unit becomes equal to or lower than a predetermined voltage, a discharging of an electric storage unit connected to an upstream side of the single electric storage unit is started through a short circuit of the single electric storage unit.

[7] The electric storage unit group described in [5] or [6], wherein a discharging from an electric storage unit connected to an upstream side of the single electric storage unit is prohibited during discharging from the single electric storage unit.

[8] The electric storage unit group described in any one of [5] to [7], wherein, at an upstream side of the electric storage unit group, the electric storage unit group is connected to a power supply for charging an electric storage unit, and when a rechargeable battery cell constituting a single electric storage unit is fully charged, a charging of the single electric storage unit is stopped, and an electric storage unit connected to a more downstream side than the single electric storage unit is charged through the single electric storage unit.

[9] The electric storage unit group described in any one of [5] to [8], wherein the electric storage unit includes:

(A) a housing having a polygonal prism shape;

(B) a rechargeable battery cell stored in the housing;

(C) a charging/discharging control unit stored in the housing and connected to the rechargeable battery cell;

(D) at least one power input unit disposed in the housing and connected to the charging/discharging control unit; and (E) at least one power output unit disposed in the housing and connected to the charging/discharging control unit.

[10] <Charger: First Aspect>

A charger including:

an electric storage unit group in which a plurality of electric storage units having rechargeable battery cells are linearly or reticulately connected, wherein, at an upstream side of the electric storage unit group, the electric storage unit group is connected to a power supply for charging the electric storage units, and when a rechargeable battery cell constituting a single electric storage unit is fully charged, a charging of the single electric storage unit is stopped, and an electric storage unit connected to a more downstream side than the single electric storage unit is charged through the single electric storage unit.

[11] <Charger: Second Aspect>

A charger including:

an electric storage unit group in which a plurality of electric storage units having rechargeable battery cells are linearly or reticulately connected, wherein, at a downstream side of the electric storage unit group, the electric storage unit group is connected to a load, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

[12] <Electronic Device: First Aspect>

An electronic device including:

an electric storage unit group in which a plurality of electric storage units having rechargeable battery cells are linearly or reticulately connected; and an electronic component that receives power from the electric storage unit group, wherein the electric storage unit group is connected to a power supply for charging the electric storage units at an upstream side of the electric storage unit group, and is connected to the electronic component at a downstream side of the electric storage unit, and when a rechargeable battery cell constituting a single electric storage unit is fully charged, a charging of the single electric storage unit is stopped, and an electric storage unit connected to a more downstream side than the single electric storage unit is charged through the single electric storage unit.

[13] <Electronic Device: Second Aspect>

An electronic device including:

an electric storage unit group in which a plurality of electric storage units having rechargeable battery cells are linearly or reticulately connected; and an electronic component that receives power from the electric storage unit group, wherein, at a downstream side of the electric storage unit group, the electric storage unit group is connected to the electronic component, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

[14] <Electric Vehicle: First Aspect>

An electric vehicle including:

an electric storage unit group in which a plurality of electric storage units having rechargeable battery cells are linearly or reticulately connected;

a power generator; and a power/driving force converter, wherein the electric storage unit group is connected to the power generator for charging the electric storage units at an upstream side of the electric storage unit group, and is connected to the power/driving force converter at a downstream side of the electric storage unit group, and when a rechargeable battery cell constituting a single electric storage unit is fully charged, a charging of the single electric storage unit is stopped, and an electric storage unit connected to a more downstream side than the single electric storage unit is charged through the single electric storage unit.

[15] <Electric Vehicle: Second Aspect>

An electric vehicle including:

an electric storage unit group in which a plurality of electric storage units having rechargeable battery cells are linearly or reticulately connected;

a power generator; and a power/driving force converter, wherein the electric storage unit group is connected to the power generator for charging the electric storage units at an upstream side of the electric storage unit group, and is connected to the power/driving force converter at a downstream side of the electric storage unit group, and when a voltage of a rechargeable battery cell constituting a single electric storage unit becomes equal to or lower than a predetermined voltage, a discharging from the single electric storage unit is stopped, and a discharging of an electric storage unit connected to an upstream side of the single electric storage unit is started.

[16] <Method for Charging Electric Storage Unit Group>

A method for charging a rechargeable battery cell in an electric storage unit group in which a plurality of electric storage units having rechargeable battery cells are linearly or reticulately connected, wherein, at an upstream side of the electric storage unit group, the electric storage unit group is connected to a power supply for charging the electric storage units, and the method includes a charging process of, when a rechargeable battery cell constituting a single electric storage unit is fully charged, stopping charging the single electric storage unit, and charging an electric storage unit connected to a more downstream side than the single electric storage unit through the single electric storage unit.

[17] The method for charging an electric storage unit group described in [16], wherein the charging process is repeated until the rechargeable battery cells constituting the entire electric storage units are fully charged.

[18] The method for charging an electric storage unit group described in [16] or [17], wherein each of the electric storage units includes a short circuit, and when a rechargeable battery cell constituting the single electric storage unit is fully charged during the charging process, an electric storage unit connected to a downstream side of the single electric storage unit is charged through a short circuit of the single electric storage unit.

[19] The method for charging an electric storage unit group described in any one of [16] to [18], wherein outflow of power to an electric storage unit connected to a downstream side of the single electric storage unit is prohibited until the single electric storage unit is fully charged.

[20] The method for charging an electric storage unit group described in [16] to [19], wherein the electric storage unit includes:

(A) a housing having a polygonal prism shape;

(B) a rechargeable battery cell stored in the housing;

(C) a charging/discharging control unit stored in the housing and connected to the rechargeable battery cell;

(D) at least one power input unit disposed in the housing and connected to the charging/discharging control unit; and (E) at least one power output unit disposed in the housing and connected to the charging/discharging control unit.

[21] <Method for Discharging Electric Storage Unit Group>

A method for discharging a rechargeable battery cell in an electric storage unit group in which a plurality of electric storage units having rechargeable battery cells are linearly or reticulately connected, wherein, at a downstream side of the electric storage unit group, the electric storage unit group is connected to a load, and the method includes a discharging process of, when a voltage of a rechargeable battery cell constituting a single electric storage unit becomes equal to or lower than a predetermined voltage, stopping discharging from the single electric storage unit, and starting discharging an electric storage unit connected to an upstream side of the single electric storage unit.

[22] The method for charging an electric storage unit group described in [21], wherein the discharging process is repeated until a voltage of the rechargeable battery cells constituting the entire electric storage units becomes equal to or lower than a predetermined voltage.

[23] The method for charging an electric storage unit group described in [21] or [22], wherein each of the electric storage units includes a short circuit, and when a voltage of the rechargeable battery cell constituting the single electric storage unit becomes equal to or lower than a predetermined voltage during a discharging process, a discharging of an electric storage unit connected to an upstream side of the single electric storage unit is started through a short circuit of the single electric storage unit.

[24] The method for charging an electric storage unit group described in [21] to [23], wherein a discharging from an electric storage unit connected to an upstream side of the single electric storage unit is prohibited during a discharging from the single electric storage unit.

[25] The method for charging an electric storage unit group described in any one of [21] to [24], wherein, at an upstream side of an electric storage unit group, the electric storage unit group is connected to a power supply for charging an electric storage unit, and the method includes a discharging process of, when a rechargeable battery cell constituting a single electric storage unit is fully charged, stopping a charging of the single electric storage unit, and charging an electric storage unit connected to a more downstream side than the single electric storage unit through the single electric storage unit.

[26] The method for charging an electric storage unit group described in any one of [21] to [25], wherein the electric storage unit includes:

(A) a housing having a polygonal prism shape;

(B) a rechargeable battery cell stored in the housing;

(C) a charging/discharging control unit stored in the housing and connected to the rechargeable battery cell;

(D) at least one power input unit disposed in the housing and connected to the charging/discharging control unit; and (E) at least one power output unit disposed in the housing and connected to the charging/discharging control unit.

[27] <Method for Supplying and Receiving Power: First Aspect>

A method for supplying and receiving power, which supplies power from an electric storage unit group in which a plurality of electric storage units having rechargeable battery cells are linearly or reticulately connected, and receives power from a power generator and a power distribution grid, wherein the electric storage unit group is connected to the power generator for charging the electric storage units through the power distribution grid at an upstream side of the electric storage unit group, and is connected to a load at a downstream side of the electric storage unit group, and the method includes a charging process of, when a rechargeable battery cell constituting a single electric storage unit is fully charged, stopping charging the single electric storage unit, and charging an electric storage unit connected to a more downstream side than the single electric storage unit through the single electric storage unit.

[28] <Method for Supplying and Receiving Power: Second Aspect>

A method for supplying and receiving power, which supplies power from an electric storage unit group in which a plurality of electric storage units having rechargeable battery cells are linearly or reticulately connected, and receives power from a power generator and a power distribution grid, wherein the electric storage unit group is connected to the power generator for charging the electric storage units through the power distribution grid at an upstream side of the electric storage unit group, and is connected to a load at a downstream side of the electric storage unit group, and the method includes a discharging process of, when a voltage of a rechargeable battery cell constituting a single electric storage unit becomes equal to or lower than a predetermined voltage, stopping discharging from the single electric storage unit, and starting discharging an electric storage unit connected to an upstream side of the single electric storage unit.

[29] <Method for Determining Charging/Discharging Route in Electric Storage Unit Group>

A method for determining a charging/discharging route in an electric storage unit group, in which a plurality of electric storage units having rechargeable battery cells are linearly or reticulately connected; at an upstream side of the electric storage unit group, the electric storage unit group is connected to a power supply for charging the electric storage units; and, at a downstream side of the electric storage unit group, the electric storage unit group is connected to a load, wherein when the number of electric storage units constituting the electric storage unit group is N, an N-th order square matrix A is calculated, a case where a value of an element [i, j] of the N-th order square matrix A (where $1 \leq i \leq N$, $1 \leq j \leq N$) is 0 represents that an i-th electric storage unit and a j-th electric storage unit are not connected to each other, and a case where the value of the element [i, j] of the N-th order square matrix A is 1 represents that the i-th electric storage unit and the j-th electric storage unit are connected to each other, in a matrix $A^m$, which is the m-th power of the N-th order square matrix A, by calculating a minimum m value, at which the value of the element [i, j] is nonzero, the number of electric storage units existing from the i-th electric storage unit to the j-th electric storage unit is calculated as (m−1), when m=1, the j-th electric storage unit from the i-th electric storage unit is determined as a charging/discharging route, when m≥2, by calculating a minimum $k_{m'+1}$ at which an element [i, $k_{m'+1}$] (where, m'=1, 2, 3 ..., m−1, and $k_1$=j) in a matrix $A^{m-m'}$, which is the (m−m')-th power of the N-th order square matrix A, and an element [$k_{m'+1}$, $k_{m'}$] in the N-th order square matrix A are nonzero at the same time, a $k_{m'+1}$-th electric storage unit is designated as an electric storage unit that is one ahead of the $k_{m'}$-th electric storage unit in electric storage units existing from the i-th electric storage unit to the $k_{m'}$-th electric storage unit, the operation is repeated until the value of m' becomes (m−1) from 1, and the electric storage units existing from the i-th electric storage unit to the j-th electric storage unit are designated, and the operation is performed on the entire electric storage units to determine the charging/discharging route from the i-th electric storage unit to the j-th electric storage unit.

It should be understood that various changes and modifications to the presently preferred embodiments described herein will be apparent to those skilled in the art. Such changes and modifications can be made without departing form the spirit and scope of the present subject matter and without diminishing its intended advantages. It is therefore intended that such changes and modifications be covered by the appended claims.

REFERENCE SIGNS LIST 10, 210 Electric storage unit group (power supply unit group)
11, 11A, 11B, 11C, 11D, 11E, 11F, 11G, 11H, 11I, 211, 211 Electric storage unit (power supply unit)
12 Power supply
14 Power consuming device
13, 15 Wire
16 Controller
17 Communication unit
20 Housing
30 Rechargeable battery cell
40 Charging/Discharging control unit
41 MPU
42 Storage unit
43 Integrated circuit (charging circuit)
44 DC/DC converter (DC/DC converter for output)
45 DC/DC converter for control system
46 DC/DC converter for USB
47 Printed wiring board
51 Power input unit
52 Input display unit
53 Power output unit
54 Output display unit
55 USB terminal portion
56A Pin
56B Hole portion
57 Grip
58 Charging state display unit and discharging display unit or remaining battery level display unit
100 Vehicle controller
101 Engine
102 Power generator
103 Power/driving force converter
104 Various sensors
105 Charging port
106 Driving wheel
107 Wheel

The invention claimed is:

1. An electric storage unit group comprising:
a plurality of electric storage units having rechargeable battery cells and linearly or reticulately connected,
wherein, at an upstream side of the electric storage unit group, the electric storage unit group is configured to be connected to a power supply for charging the electric storage units, and
when a first electric storage unit at the upstream side of the electric storage unit group is fully charged, a charging of the first electric storage unit is stopped, and then a second electric storage unit connected to a downstream side of the first electric storage unit is charged directly through the first electric storage unit.

2. The electric storage unit group according to claim 1, wherein each of the electric storage units includes a short circuit, and
when the first electric storage unit is fully charged, the second electric storage unit is charged through the short circuit of the first electric storage unit.

3. The electric storage unit group according to claim 1, wherein the first electric storage unit is configured to prohibit an outflow of power to the second electric storage unit until the first electric storage unit is fully charged.

4. The electric storage unit group according to claim 1, wherein the electric storage unit includes:
(A) a housing having a polygonal prism shape;
(B) a rechargeable battery cell stored in the housing;
(C) a charging/discharging control unit stored in the housing and connected to the rechargeable battery cell;
(D) at least one power input unit disposed in the housing and connected to the charging/discharging control unit; and
(E) at least one power output unit disposed in the housing and connected to the charging/discharging control unit.

5. A method for determining a charging/discharging route in the electric storage unit group according to claim 1, wherein when the number of electric storage units constituting the electric storage unit group is N, an N-th order square matrix A is calculated, a case where a value of an element [i, j] of the N-th order square matrix A (where $1 \leq i \leq N$, $1 \leq j \leq N$) is 0 represents that an i-th electric storage unit and a j-th electric storage unit are not connected to each other, and a case where the value of the element [i, j] of the N-th order square matrix A is 1 represents that the i-th electric storage unit and the j-th electric storage unit are connected to each other, in a matrix $A^m$, which is the m-th power of the N-th order square matrix A, by calculating a minimum m value, at which the value of the element [i, j] is nonzero, the number of electric storage units existing from the i-th electric storage unit to the j-th electric storage unit is calculated as (m−1), when m=1, the j-th electric storage unit from the i-th electric storage unit is determined as a charging/discharging route, when m≥2, by calculating a minimum $k_{m'+1}$ at which an element $[i, k_{m'+1}]$ (where, m'=1, 2, 3 ..., m−1, and $k_1$=j) in a matrix $A^{m-m'}$, which is the (m−m')-th power of the N-th order square matrix A, and an element $[k_{m'+1}, k_{m'}]$ in the N-th order square matrix A are nonzero at the same time, a $k_{m'+1}$-th electric storage unit is designated as an electric storage unit that is one ahead of the $k_{m'}$-th electric storage unit in electric storage units existing from the i-th electric storage unit to the $k_{m'}$-th electric storage unit, the operation is repeated until the value of m' becomes (m−1) from 1, and the electric storage units existing from the i-th electric storage unit to the j-th electric storage unit are designated, and the operation is performed on the entire electric storage units to determine the charging/discharging route from the i-th electric storage unit to the j-th electric storage unit.

6. An electric storage unit group comprising:

a plurality of electric storage units having rechargeable battery cells and linearly or reticulately connected, wherein, at a downstream side of the electric storage unit group, the electric storage unit group is connected to a load, and when a voltage of a third electric storage unit at the downstream side of the electric storage unit group becomes equal to or lower than a predetermined voltage, a first discharging from the third electric storage unit is stopped, and then a second discharging of a fourth electric storage unit connected to an upstream side of the third electric storage unit is started directly through the third electric storage unit.

7. The electric storage unit group according to claim 6, wherein each of the electric storage units includes a short circuit, and the second discharging of the fourth electric storage unit is started through the short circuit of the third electric storage unit.

8. The electric storage unit group according to claim 6, wherein the second discharging from the fourth electric storage unit is prohibited during the first discharging from the third electric storage unit.

9. The electric storage unit group according to claim 6, wherein, at an upstream side of the electric storage unit group, the electric storage unit group is connected to a power supply for charging an electric storage unit, and when the fourth electric storage unit is fully charged, a charging of the fourth electric storage unit is stopped, and then the third electric storage unit connected to a downstream side of the fourth storage unit is charged through the fourth electric storage unit.

10. The electric storage unit group according to claim 6, wherein the electric storage unit includes:

(A) a housing having a polygonal prism shape;

(B) a rechargeable battery cell stored in the housing;

(C) a charging/discharging control unit stored in the housing and connected to the rechargeable battery cell;

(D) at least one power input unit disposed in the housing and connected to the charging/discharging control unit; and (E) at least one power output unit disposed in the housing and connected to the charging/discharging control unit.

11. A charger comprising:

an electric storage unit group in which a plurality of electric storage units having rechargeable battery cells are linearly or reticulately connected, wherein, at an upstream side of the electric storage unit group, the electric storage unit group is configured to be connected to a power supply for charging the electric storage units, and when a first electric storage unit at the upstream side of the electric storage unit group is fully charged, a charging of the first electric storage unit is stopped, and then a second electric storage unit connected to a downstream side of the first electric storage unit is charged directly through the first electric storage unit.

12. A charger comprising:

an electric storage unit group in which a plurality of electric storage units having rechargeable battery cells are linearly or reticulately connected, wherein, at a downstream side of the electric storage unit group, the electric storage unit group is connected to a load, and when a voltage of a third electric storage unit at the downstream side of the electric storage unit group becomes equal to or lower than a predetermined voltage, a first discharging from the third electric storage unit is stopped, and then a second discharging of a fourth electric storage unit connected to an upstream side of the third electric storage unit is started directly through the third electric storage unit.

13. An electronic device comprising:

an electric storage unit group in which a plurality of electric storage units having rechargeable battery cells are linearly or reticulately connected; and an electronic component that receives power from the electric storage unit group, wherein the electric storage unit group is configured to be connected to a power supply for charging the electric storage units at an upstream side of the electric storage unit group, and is configured to be connected to the electronic component at a downstream side of the electric storage unit group, and when a first electric storage unit at the upstream side of the electric storage unit group is fully charged, a charging of the first electric storage unit is stopped, and then a second electric storage unit connected to a downstream side of the first electric storage unit is charged directly through the first electric storage unit.

14. An electronic device comprising:

an electric storage unit group in which a plurality of electric storage units having rechargeable battery cells are linearly or reticulately connected; and an electronic component that receives power from the electric storage unit group, wherein, at a downstream side of the electric storage unit group, the electric storage unit group is connected to the electronic component, and when a voltage of a third electric storage unit at the downstream side of the electric storage unit group becomes equal to or lower than a predetermined voltage, a first discharging from the third electric storage unit is stopped, and then a second discharging of a fourth electric storage unit connected to an upstream side of the third electric storage unit is started directly through the third electric storage unit.

15. An electric vehicle comprising:
an electric storage unit group in which a plurality of electric storage units having rechargeable battery cells are linearly or reticulately connected;
a power generator; and
a power/driving force converter,
wherein the electric storage unit group is configured to be connected to the power generator for charging the electric storage units at an upstream side of the electric storage unit group, and is configured to be connected to the power/driving force converter at a downstream side of the electric storage unit group, and
when a first electric storage unit at the upstream side of the electric storage is fully charged, a charging of the first electric storage unit is stopped, and then a second electric storage unit connected to a downstream side of the first electric storage unit is charged directly through the first electric storage unit.

16. An electric vehicle comprising:
an electric storage unit group in which a plurality of electric storage units having rechargeable battery cells are linearly or reticulately connected;
a power generator; and
a power/driving force converter,
wherein the electric storage unit group is configured to be connected to the power generator for charging the electric storage units at an upstream side of the electric storage unit group, and is configured to be connected to the power/driving force converter at a downstream side of the electric storage unit group, and
when a voltage of a third electric storage unit at the downstream side of the electric storage unit group becomes equal to or lower than a predetermined voltage, a first discharging from the third electric storage unit is stopped, and then a second discharging of a fourth electric storage unit connected to an upstream side of the third electric storage unit is started directly through the third electric storage unit.

17. A method for charging a rechargeable battery cell in an electric storage unit group in which a plurality of electric storage units having rechargeable battery cells are linearly or reticulately connected,
wherein, at an upstream side of the electric storage unit group, the electric storage unit group is configured to be connected to a power supply for charging the electric storage units, and
the method comprises a charging process of, when a first electric storage unit at the upstream side of the electric storage unit group is fully charged, stopping charging the first electric storage unit, and charging a second electric storage unit connected to a downstream side of the first electric storage unit through the first electric storage unit.

18. The method for charging an electric storage unit group according to claim 17, wherein the charging process is repeated until all the electric storage units are fully charged.

19. The method for charging an electric storage unit group according to claim 17, wherein each of the electric storage units includes a short circuit, and
when the first electric storage unit is fully charged during the charging process, the second electric storage unit is charged through the short circuit of the first electric storage unit.

20. The method for charging an electric storage unit group according to claim 17, wherein the first electric storage unit is configured to prohibit an outflow of power to the second electric storage unit until the first electric storage unit is fully charged.

21. The method for charging an electric storage unit group according to claim 17, wherein the electric storage unit includes:
(A) a housing having a polygonal prism shape;
(B) a rechargeable battery cell stored in the housing;
(C) a charging/discharging control unit stored in the housing and connected to the rechargeable battery cell;
(D) at least one power input unit disposed in the housing and connected to the charging/discharging control unit; and
(E) at least one power output unit disposed in the housing and connected to the charging/discharging control unit.

22. A method for discharging a rechargeable battery cell in an electric storage unit group in which a plurality of electric storage units having rechargeable battery cells are linearly or reticulately connected,
wherein, at a downstream side of the electric storage unit group, the electric storage unit group is configured to be connected to a load, and
the method comprises a discharging process of, when a voltage of a third electric storage unit at the downstream side of the electric storage unit group becomes equal to or lower than a predetermined voltage, stopping discharging from the third electric storage unit, and starting discharging a fourth electric storage unit connected to an upstream side of the third electric storage unit directly through the third electric storage unit.

23. The method for charging an electric storage unit group according to claim 22, wherein the discharging process is repeated until each of the electric storage unit becomes equal to or lower than a predetermined voltage.

24. The method for charging an electric storage unit group according to claim 22, wherein each of the electric storage units includes a short circuit, and
when the third electric storage unit becomes equal to or lower than a predetermined voltage during the first discharging process, the second discharging of the fourth electric storage unit is started through the short circuit of the third electric storage unit.

25. The method for charging an electric storage unit group according to claim 22, wherein the second discharging from the fourth electric storage unit is prohibited during the first discharging from the third electric storage unit.

26. The method for charging an electric storage unit group according to claim 22, wherein, at an upstream side of an electric storage unit group, the electric storage unit group is connected to a power supply for charging an electric storage unit, and
the method comprises a discharging process of, when the fourth electric storage unit is fully charged, stopping a charging of the fourth electric storage unit, and charging the third electric storage unit connected to a downstream side of the fourth storage unit directly through the fourth electric storage unit.

27. The method for charging an electric storage unit group according to claim 22, wherein the electric storage unit includes:

(A) a housing having a polygonal prism shape;
(B) a rechargeable battery cell stored in the housing;
(C) a charging/discharging control unit stored in the housing and connected to the rechargeable battery cell;
(D) at least one power input unit disposed in the housing and connected to the charging/discharging control unit; and
(E) at least one power output unit disposed in the housing and connected to the charging/discharging control unit.

28. A method for supplying and receiving power, which supplies power from an electric storage unit group in which a plurality of electric storage units having rechargeable battery cells are linearly or reticulately connected, and receives power from a power generator and a power distribution grid, wherein the electric storage unit group is configured to be connected to the power generator for charging the electric storage units through the power distribution grid at an upstream side of the electric storage unit group, and is configured to be connected to a load at a downstream side of the electric storage unit group, and the method comprises a charging process of, when a first electric storage unit at the upstream side of the electric storage unit group is fully charged, stopping charging the first electric storage unit, and charging a second electric storage unit connected to a more downstream side of the first electric storage unit directly through the first electric storage unit.

29. A method for supplying and receiving power, which supplies power from an electric storage unit group in which a plurality of electric storage units having rechargeable battery cells are linearly or reticulately connected, and receives power from a power generator and a power distribution grid, wherein the electric storage unit group is configured to be connected to the power generator for charging the electric storage units through the power distribution grid at an upstream side of the electric storage unit group, and is connected to a load at a downstream side of the electric storage unit group, and the method comprises a discharging process of, when a voltage of a third electric storage unit at the downstream side of the electric storage unit group becomes equal to or lower than a predetermined voltage, stopping discharging from the third electric storage unit, and starting discharging a fourth electric storage unit connected to an upstream side of the third electric storage unit directly through the third electric storage unit.

* * * * *